United States Patent
Stemple

(12) 
(10) Patent No.: US 8,561,955 B2
(45) Date of Patent: Oct. 22, 2013

(54) LOW PROFILE ARTICULATING MOUNTING SYSTEM

(75) Inventor: James Michael Stemple, Marengo, IL (US)

(73) Assignee: Peerless Industries, Inc., Aurora, IL (US)

( * ) Notice: Subject to any disclaimer, the term of this patent is extended or adjusted under 35 U.S.C. 154(b) by 603 days.

(21) Appl. No.: 12/637,018

(22) Filed: Dec. 14, 2009

(65) Prior Publication Data

US 2010/0171014 A1    Jul. 8, 2010

Related U.S. Application Data

(60) Provisional application No. 61/142,599, filed on Jan. 5, 2009, provisional application No. 61/187,117, filed on Jun. 15, 2009.

(51) Int. Cl.
*E04G 3/00* (2006.01)

(52) U.S. Cl.
USPC .................. 248/278.1; 248/282.1; 248/284.1; 248/276.1; 361/679.01

(58) Field of Classification Search
USPC ..................... 248/278.1, 282.1, 276.1, 284.1; 361/679.01; 403/57
See application file for complete search history.

(56) References Cited

U.S. PATENT DOCUMENTS

| | | |
|---|---|---|
| 3,656,246 A | 4/1972 | Lord |
| D377,897 S | 2/1997 | Vogels |
| D388,646 S | 1/1998 | Canton Gongora et al. |
| D395,226 S | 6/1998 | Maher et al. |
| 5,772,174 A * | 6/1998 | Hirsch et al. ............... 248/447.1 |

(Continued)

FOREIGN PATENT DOCUMENTS

| | | |
|---|---|---|
| CN | 201051411 | 4/2008 |
| DE | 202006013179 U1 | 1/2007 |

(Continued)

OTHER PUBLICATIONS

U.S. Appl. No. 12/636,238, filed Dec. 11, 2009, Monaco.

(Continued)

*Primary Examiner* — Terrell McKinnon
*Assistant Examiner* — Daniel J Breslin
(74) *Attorney, Agent, or Firm* — Foley & Lardner LLP

(57) ABSTRACT

A device mount for affixing a device to a surface such as a wall. The device mount has a surface bracket, an articulation mechanism, and a device mount plate. In various embodiments, the device mount further includes a tilt assembly. The surface mount bracket includes an upper surface bracket, a lower surface bracket and a vertical support positioned there between and connected to the lower all bracket and the upper surface bracket. The articulation mechanism has an inner articulating arm pivotally connected to the surface mount bracket and an outer articulating arm is rotatably connected to the inner articulating arm such that it maybe disposed substantially within a void of the inner articulating arm. The tilt assembly is connected to the outer articulating arm and pivotally connected to the device mount plate that is adapted to have a device mounted thereto, such that the device mount plate is selectively tiltable. The tilt assembly may comprise at least one friction hinge that substantially maintains the tilt angle of the device mount plate. When in a collapsed position, the inner articulating arm is substantially disposed between the upper surface bracket and lower surface bracket and the outer articulating arm is substantially disposed within the inner articulating arm presenting a thin profile.

9 Claims, 31 Drawing Sheets

(56) References Cited

U.S. PATENT DOCUMENTS

| | | |
|---|---|---|
| 6,102,348 A | 8/2000 | O'Neill |
| 6,256,837 B1 | 7/2001 | Lan et al. |
| D488,708 S | 4/2004 | Lam et al. |
| D489,599 S | 5/2004 | Lam |
| D496,367 S | 9/2004 | Pfister |
| D505,858 S | 6/2005 | O'Keene |
| 6,905,101 B1 | 6/2005 | Dittmer |
| D507,477 S | 7/2005 | Pfister |
| 6,915,996 B2 | 7/2005 | Lin |
| D508,917 S | 8/2005 | Wills et al. |
| 6,987,666 B2 | 1/2006 | Medica et al. |
| 7,028,961 B1 | 4/2006 | Dittmer et al. |
| D529,033 S | 9/2006 | Hung |
| D530,595 S | 10/2006 | Lam et al. |
| 7,152,836 B2 | 12/2006 | Pfister et al. |
| 7,178,774 B2 * | 2/2007 | Kim ............ 248/279.1 |
| 7,178,775 B2 | 2/2007 | Pfister et al. |
| D537,706 S | 3/2007 | Ly Hau et al. |
| D538,633 S | 3/2007 | Ly Hau et al. |
| D539,123 S | 3/2007 | Ly Hau et al. |
| D539,127 S | 3/2007 | Ly Hau et al. |
| D540,154 S | 4/2007 | Bremmon |
| D540,332 S | 4/2007 | Dittmer et al. |
| D543,210 S * | 5/2007 | Stenhouse et al. ........ D14/452 |
| D543,439 S | 5/2007 | Brassard |
| D543,548 S | 5/2007 | Muday et al. |
| 7,243,892 B2 | 7/2007 | Pfister |
| D549,558 S | 8/2007 | Dittmer et al. |
| 7,264,212 B2 | 9/2007 | Hung |
| D552,974 S | 10/2007 | Petrick et al. |
| D553,135 S | 10/2007 | Muday et al. |
| D556,205 S | 11/2007 | Wohlford et al. |
| D558,560 S | 1/2008 | Ciungan |
| D558,561 S * | 1/2008 | Ciungan ............. D8/363 |
| D558,562 S | 1/2008 | Ciungan |
| D558,563 S | 1/2008 | Ciungan |
| D558,564 S | 1/2008 | Ciungan |
| D559,087 S | 1/2008 | Ciungan |
| D559,088 S | 1/2008 | Ciungan |
| D562,113 S | 2/2008 | Ciungan et al. |
| D563,399 S * | 3/2008 | Wohlford et al. ........ D14/239 |
| D565,938 S | 4/2008 | Massoumi et al. |
| D566,531 S | 4/2008 | Massoumi et al. |
| D567,560 S | 4/2008 | Byers |
| D568,325 S | 5/2008 | Muday et al. |
| D568,890 S | 5/2008 | Sculler et al. |
| 7,380,760 B2 | 6/2008 | Dittmer |
| 7,387,286 B2 | 6/2008 | Dittmer et al. |
| 7,395,996 B2 | 7/2008 | Dittmer |
| 7,398,950 B2 * | 7/2008 | Hung ............ 248/276.1 |
| D577,730 S | 9/2008 | Rutten |
| 7,438,269 B2 | 10/2008 | Pfister et al. |
| D580,743 S | 11/2008 | Short |
| 7,448,584 B2 * | 11/2008 | Chen et al. ........... 248/278.1 |
| 7,487,943 B1 | 2/2009 | Gillespie |
| D587,504 S | 3/2009 | Russell et al. |
| D587,716 S | 3/2009 | Hau et al. |
| D590,835 S | 4/2009 | Richter |
| 7,513,469 B1 | 4/2009 | Ciungan |
| D593,080 S | 5/2009 | Russell et al. |
| D595,723 S | 7/2009 | Bures et al. |
| D596,189 S | 7/2009 | Bures et al. |
| D605,185 S | 12/2009 | Russell et al. |
| 7,641,163 B2 | 1/2010 | O'Keene |
| D611,480 S | 3/2010 | Hau et al. |
| 7,753,332 B2 | 7/2010 | O'Keene |
| D621,820 S | 8/2010 | Liang |
| D623,654 S | 9/2010 | Hau et al. |
| D627,767 S | 11/2010 | Molter et al. |
| 7,832,700 B2 | 11/2010 | Ciungan |
| 7,866,621 B1 | 1/2011 | Walters |
| D638,023 S | 5/2011 | Skull et al. |
| 7,950,613 B2 | 5/2011 | Anderson et al. |
| D641,369 S | 7/2011 | Skull et al. |
| D646,685 S | 10/2011 | Skull et al. |
| D650,373 S * | 12/2011 | Stemple ............. D14/239 |
| 2002/0011544 A1 | 1/2002 | Bosson |
| 2002/0033436 A1 | 3/2002 | Peng et al. |
| 2003/0075653 A1 * | 4/2003 | Li ............. 248/274.1 |
| 2003/0154673 A1 | 8/2003 | MacGregor et al. |
| 2004/0000031 A1 | 1/2004 | Hsu |
| 2004/0262474 A1 | 12/2004 | Boks et al. |
| 2005/0127261 A1 | 6/2005 | Lin |
| 2005/0152102 A1 | 7/2005 | Shin |
| 2006/0284037 A1 | 12/2006 | Dittmer et al. |
| 2007/0194196 A1 | 8/2007 | Pfister et al. |
| 2008/0035816 A1 | 2/2008 | Ciungan |
| 2008/0105633 A1 * | 5/2008 | Dozier et al. ............ 211/26 |
| 2008/0237424 A1 | 10/2008 | Clary |
| 2008/0258029 A1 | 10/2008 | Zhang |
| 2009/0050763 A1 | 2/2009 | Dittmer |
| 2009/0173860 A1 | 7/2009 | Remy |
| 2009/0194655 A1 | 8/2009 | Huang |
| 2009/0289159 A1 | 11/2009 | O'Keene |
| 2010/0172072 A1 | 7/2010 | Monaco |
| 2010/0213334 A1 | 8/2010 | Davenport |

FOREIGN PATENT DOCUMENTS

| | | |
|---|---|---|
| DE | 202008001895 U1 | 7/2008 |
| DE | 202009000975 U1 | 5/2009 |
| EP | 1837583 A2 | 9/2007 |
| TW | 527073 | 4/2003 |
| TW | M305523 | 1/2007 |
| WO | WO2007/035770 A1 | 3/2007 |
| WO | WO2008/083396 A1 | 7/2008 |
| WO | WO2008/123852 A1 | 10/2008 |

OTHER PUBLICATIONS

U.S. Appl. No. 12/636,256, filed Dec. 11, 2009, Anderson.
U.S. Appl. No. 12/503,718, filed Jul. 15, 2009, O'Keene.
U.S. Appl. No. 11/528,200, filed Sep. 27, 2006, Walters.
"CRr-Thread: Wall Mount for TV," CR4 Globalspec Forms, http://CR4.globalspec.com/thread/59003, Aug. 16, 2011.
Office Action and Search Report issued Mar. 13, 2013 for Taiwanese Patent Application No. 098142280, (9 pages).
Exhibit F, *Peerless* v. *Loctek*, Invalidity Chart for U.S. Patent No. D654,065 based on Selected Prior Art, Nov. 16, 2012.
"Loctek Visual Technology Corp's Initial Non-Infringement and Invalidity Contentions," *Peerless Industries, Inc.*, Plaintiff, v. *Loctek Visual Technology Corp.*, Defendant, Civil Action No. 12-CV-6248, dated Nov. 16, 2012, pp. 1-3, and 69-81.
Peerless Industries, Inc., SUA745PU Slimline® Ultra Slim Articulating Wall Arm for 32" to 46" Ultra-thin TVs, 2 (2009), http://edinw.com/Spec_Sheet/PEERLESS_SUA745PU.pdf (SUA745PU Quick Spec Sheet), 2 pgs.
Peerless Industries, Inc., SUA750PU Slimline® Ultra Slim Articulating Wall Arm for 37" to 55" Ultra-thin TVs, (2009), https://d_1_vofmza27mmhi.cloudfront.net/product-pdf/peerless-sua750pu-quick-specs.pdf (SUA7590PU Quick Spec Sheet), 2 pgs.
Peerless Industries, Inc., peerless-AV® SUA751PU, 8 (2012), http://www.peerlessmounts.com/pcattachments/BOOK8.5X11IN-203-9113-1-1-1.PDF (SUA751PU Installation Sheet), Mar. 23, 2012 20 pgs.
Peerless Product Catalog 2005-2006, 100 pgs.
Peerless SUA-745PU Universal Ultra Slim Articulating Wall Arm Catalog, Peerless Product Catalog 2005-2006, p. 45.

* cited by examiner

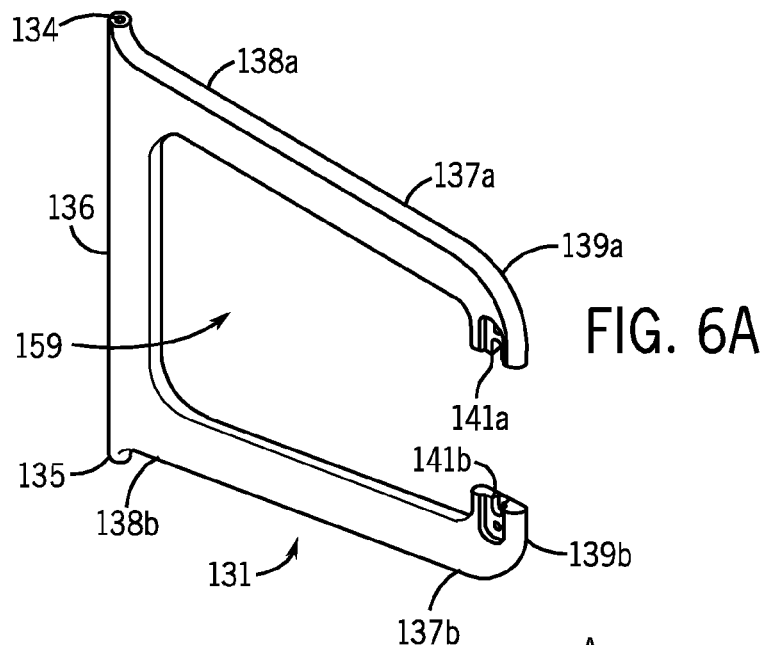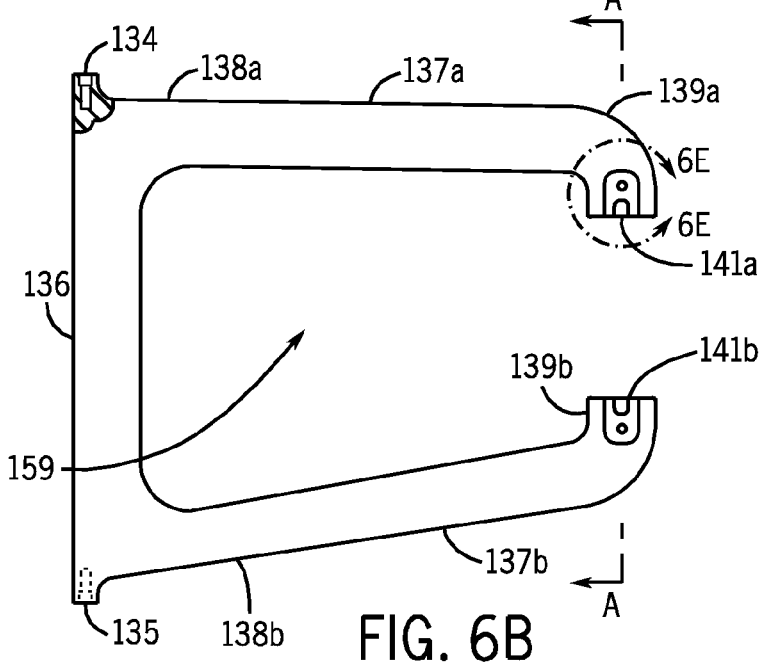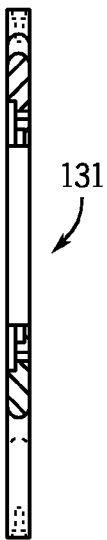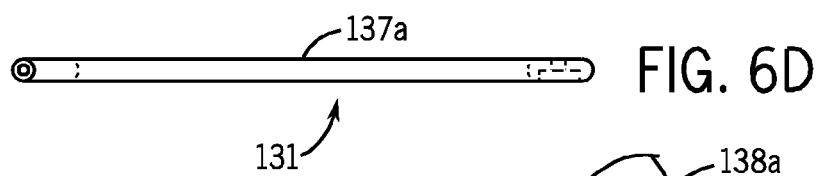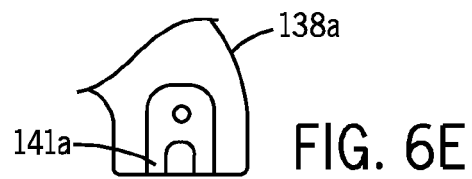

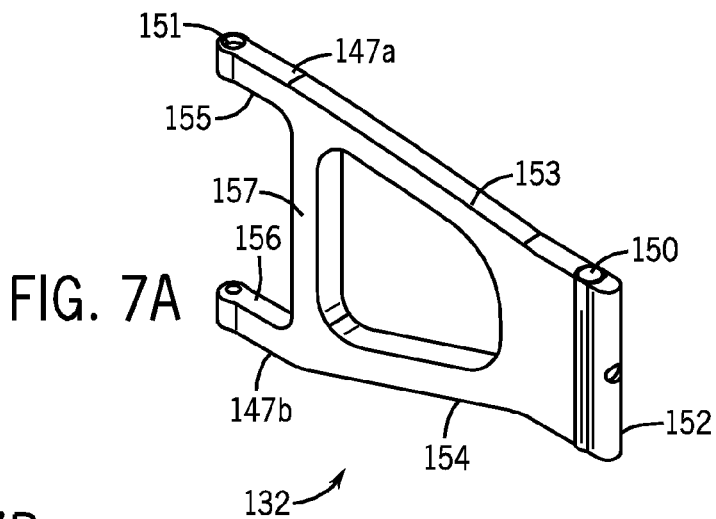
FIG. 7A
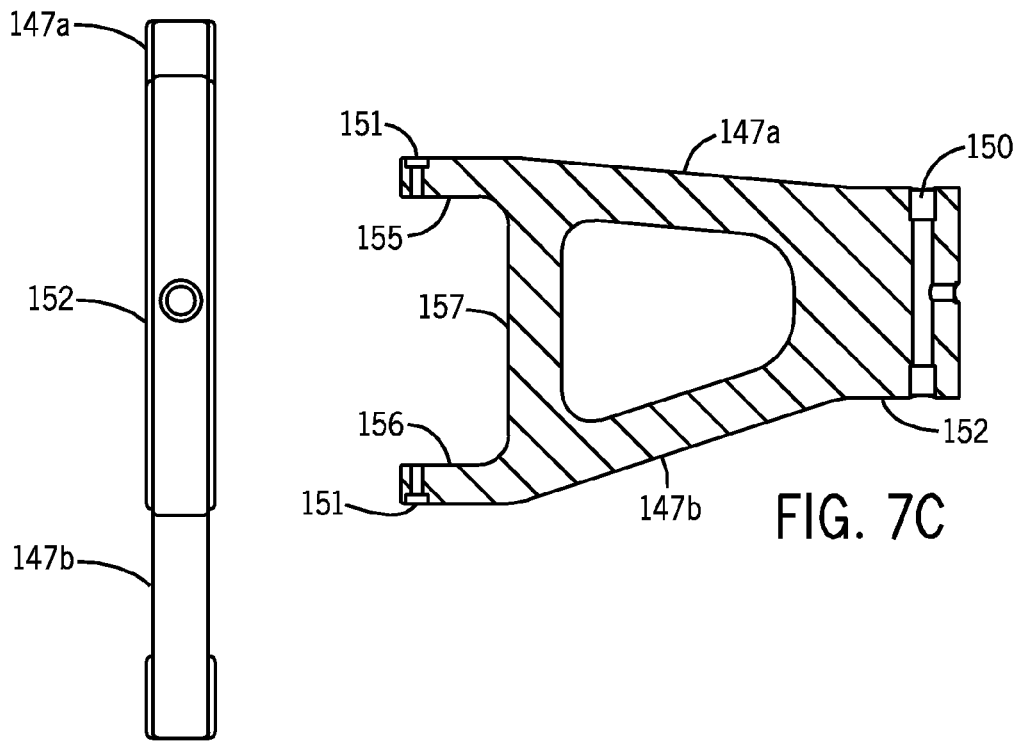
FIG. 7B
FIG. 7C
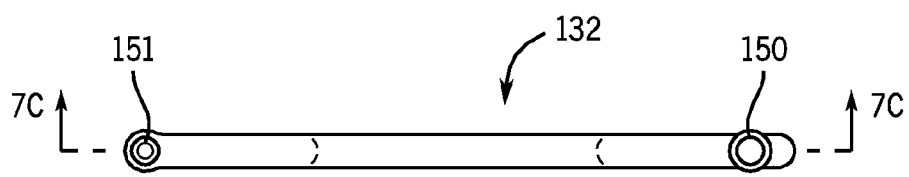
FIG. 7D

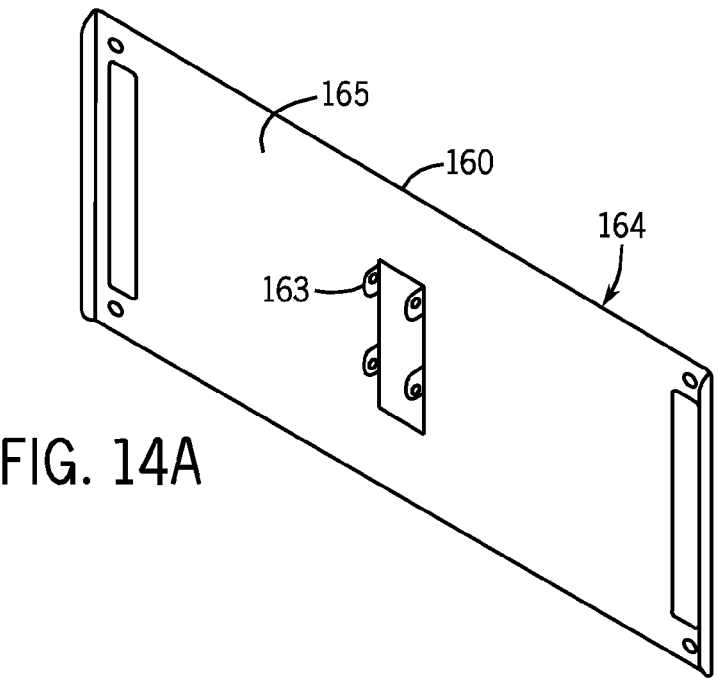
FIG. 14A
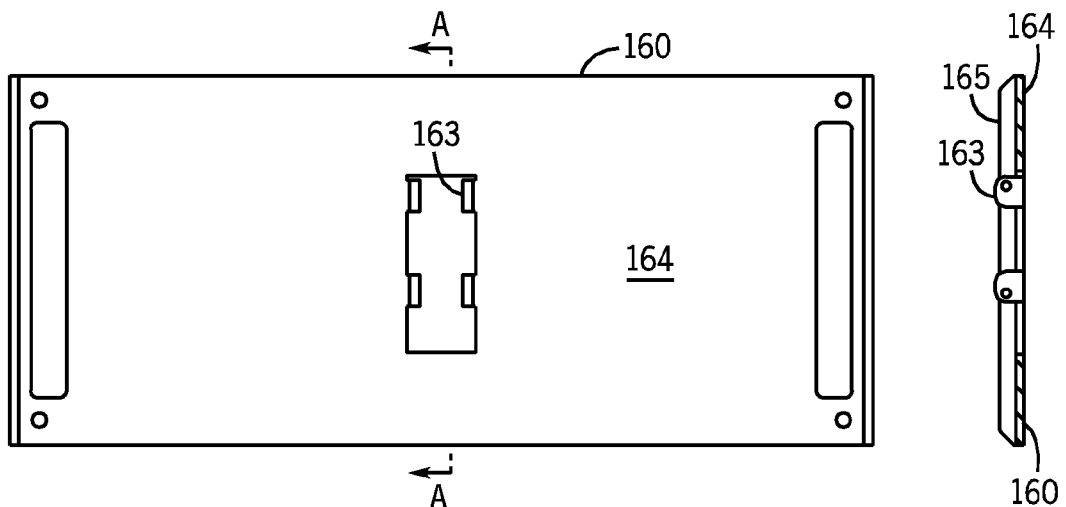
FIG. 14B
FIG. 14C
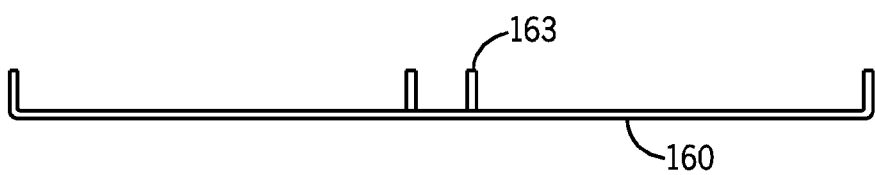
FIG. 14D

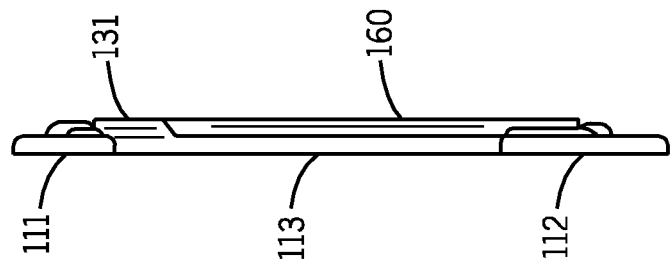
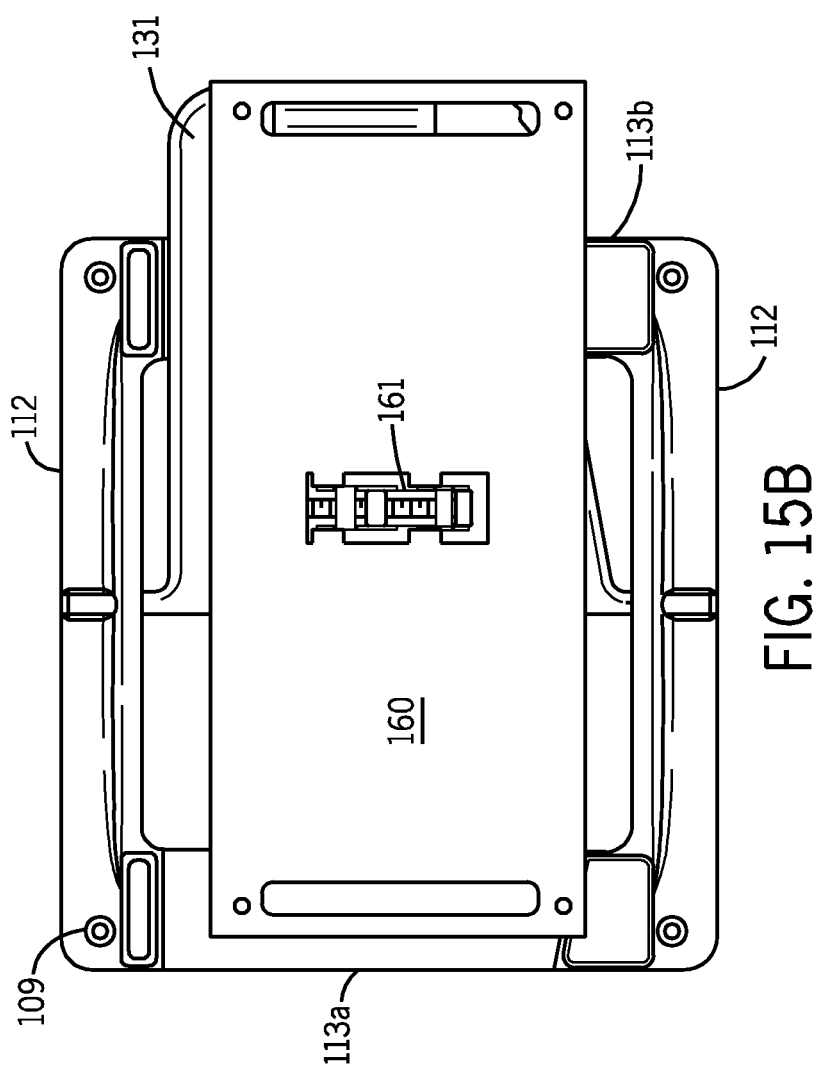
FIG. 15D
FIG. 15C
FIG. 15B

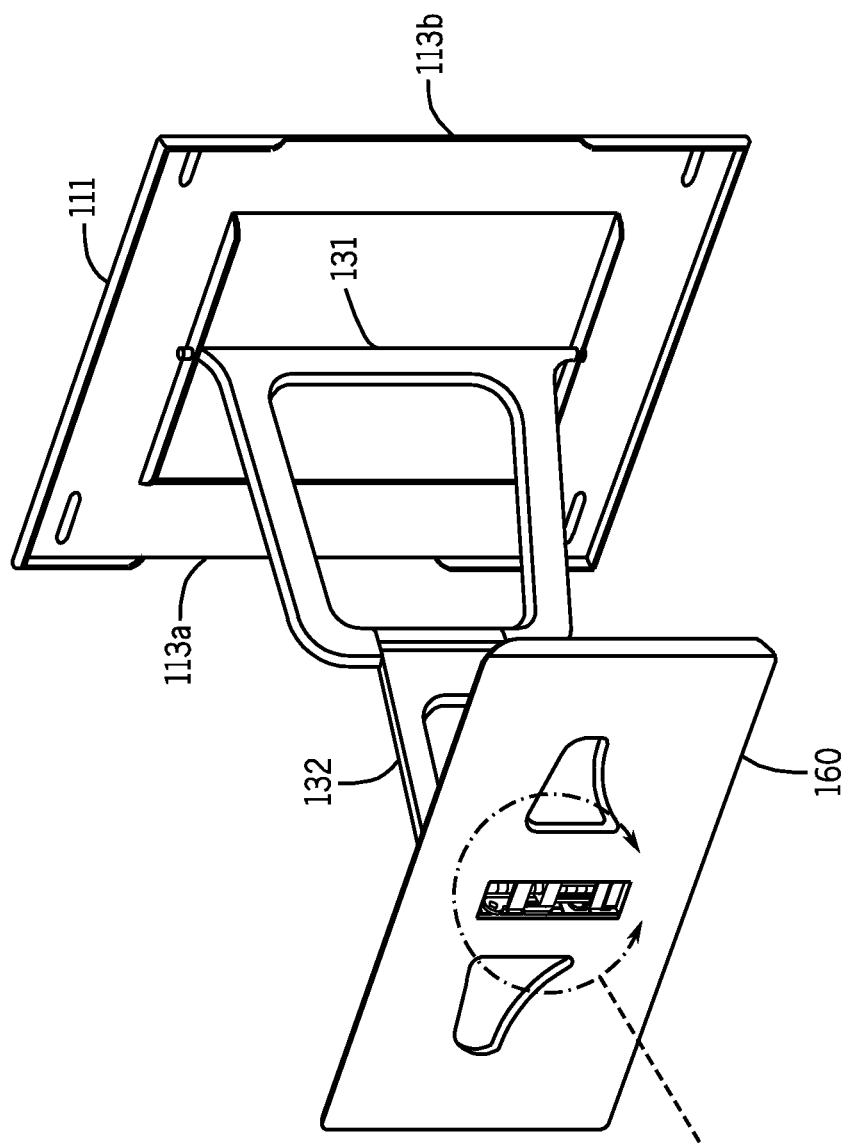
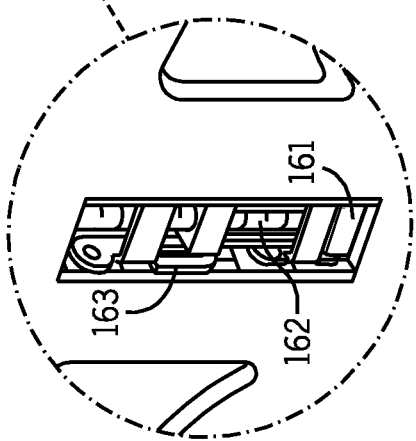
FIG. 17

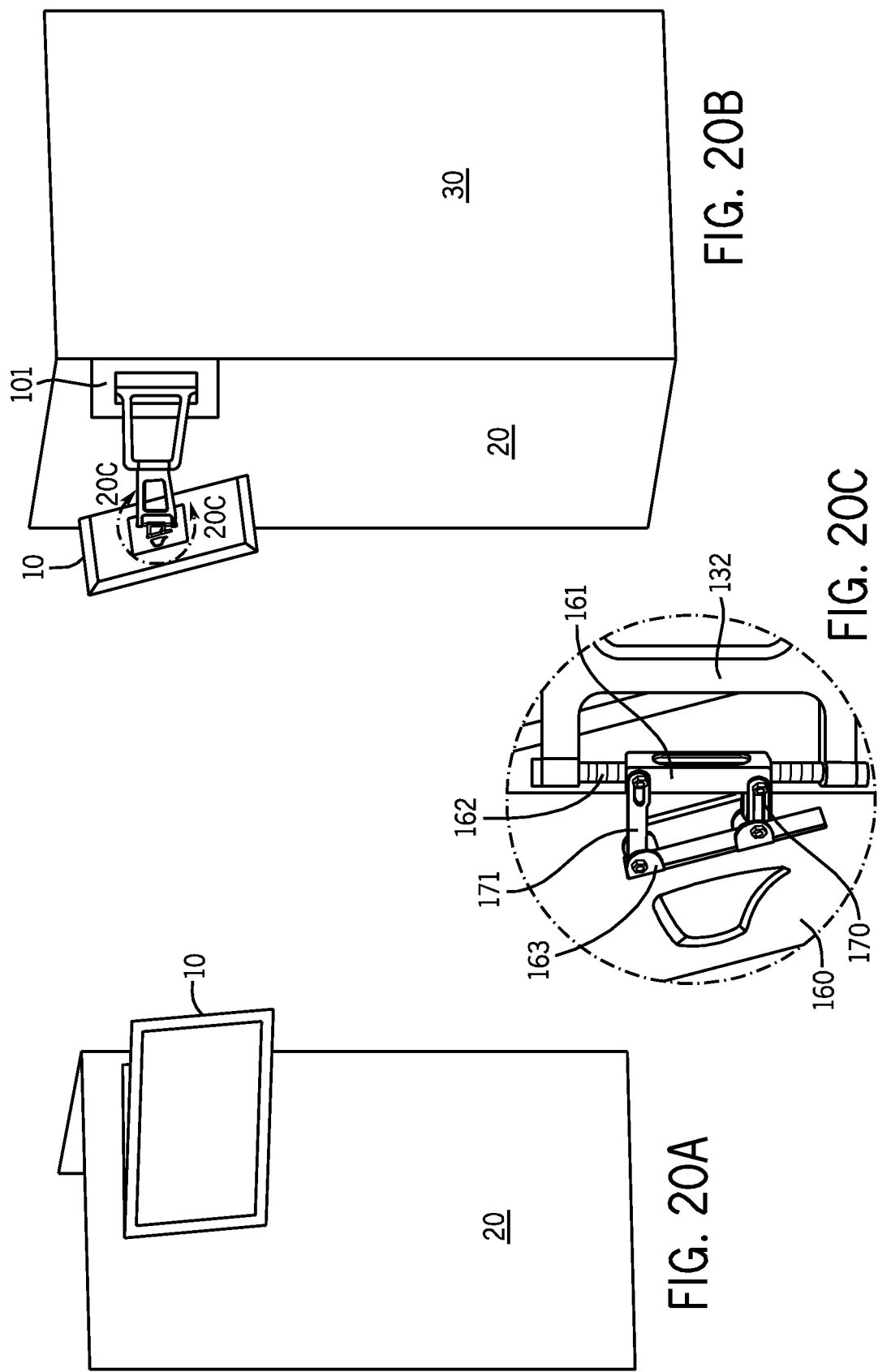

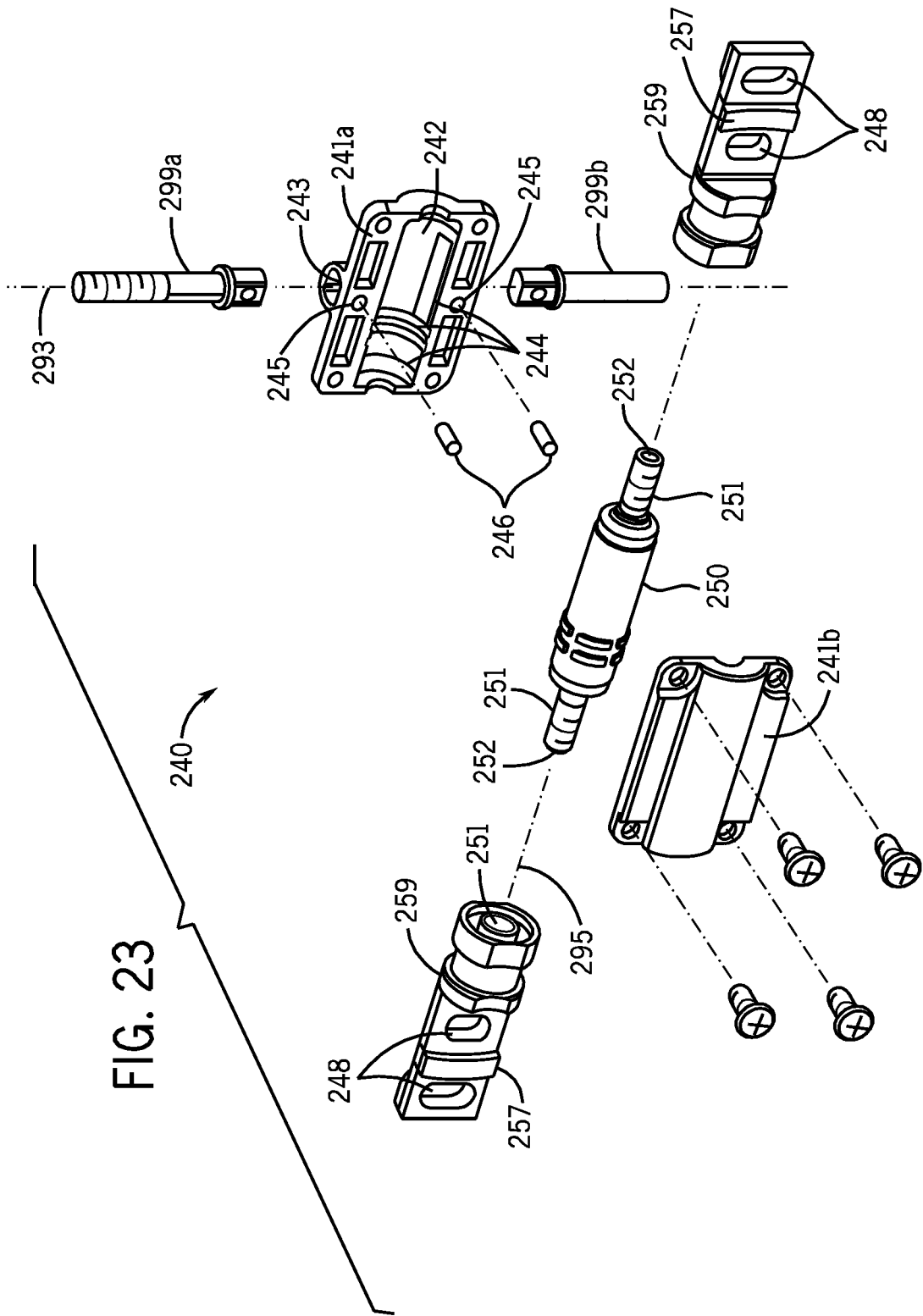

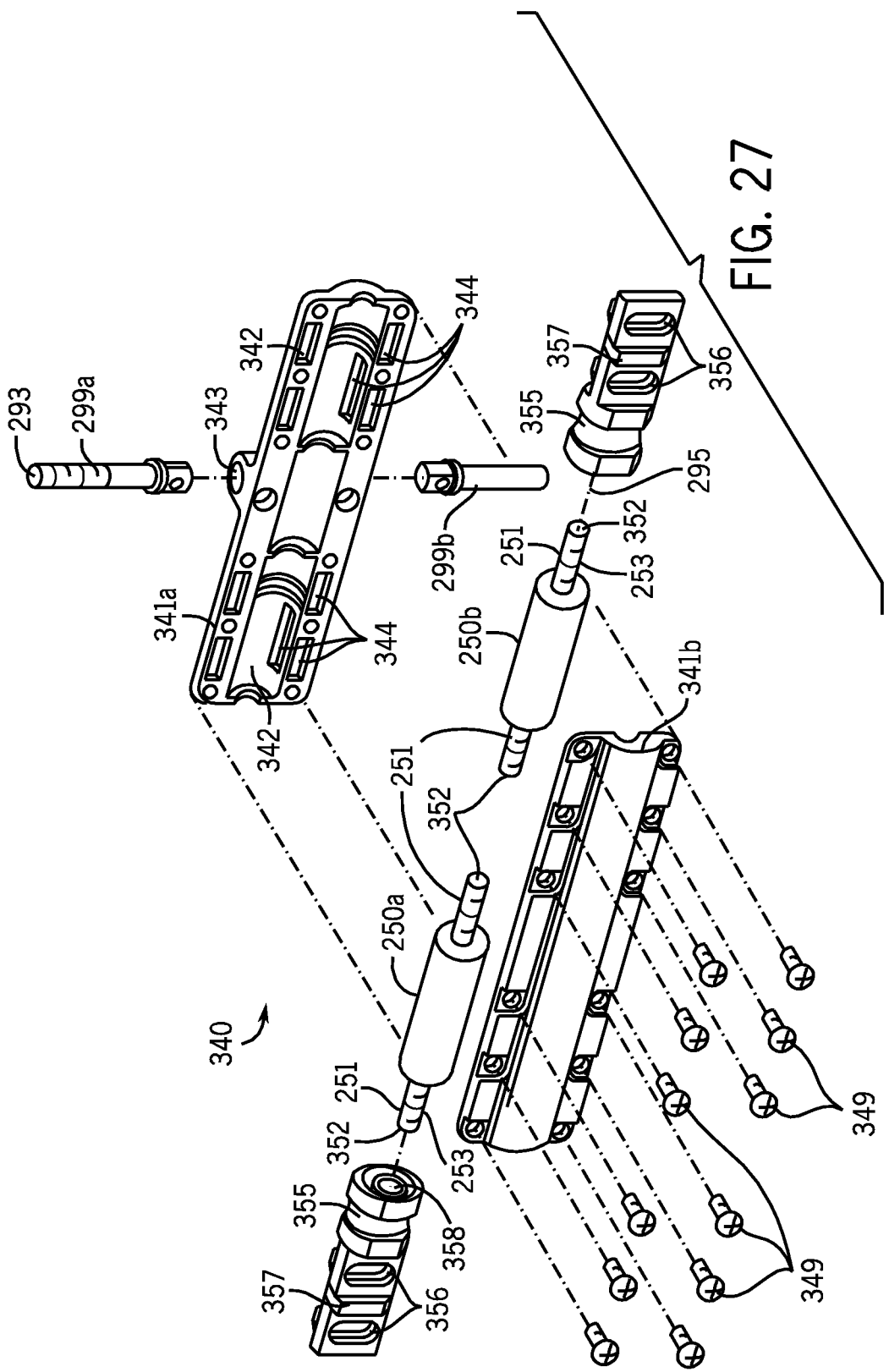

LOW PROFILE ARTICULATING MOUNTING SYSTEM

CROSS-REFERENCE TO RELATED PATENT APPLICATIONS

This application claims priority from U.S. Provisional Application No. 61/142,599, filed Jan. 5, 2009 and U.S. Provisional Application No. 61/187,117, filed Jun. 15, 2009. The contents of both applications are incorporated herein by reference in their entirety.

FIELD OF THE INVENTION

The present invention relates generally to mounting systems. More particularly, the present invention relates to moveable mounting systems with articulating arms for use with flat panel televisions, where the position of the television can be adjusted after installation.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

In recent years, flat panel displays have become enormously popular in both commercial and residential sectors typically as computer monitors or television displays. As the prices for plasma and liquid crystal display (LCD) flat panel displays have continued to fall, and the quality for the same devices have improved, more and more businesses and individuals have purchased such devices for both home and business entertainment purposes.

One of the advantages of flat panel television units that customers have found particular appealing is their relatively smaller form factor, particularly thickness, in comparison to cathode ray tube (CRT) displays. Because conventional CRT displays have a relatively large depth, the display options for such devices are quite limited. In the residential setting, most users require a television stand or large entertainment center to store the television. Such stands or entertainment centers can take up significant floor space, which is often undesirable. In the commercial or educational setting, users will often install large overhead mounting systems that can contain the television. However these systems usually require professional installation and, once the television is secured to the mount, it is often difficult to access and adjust due to its height. With flat panel televisions, on the other hand, users are presented with a relatively new option: mounting the television directly to the wall. By mounting the television to the wall, a person can eliminate the need to take up potentially valuable floor space.

Although the introduction of flat panel televisions on a wide scale has presented new opportunities to both residential and commercial customers, it has also presented new challenges. Many of the technologies used in flat panel displays have limited viewing angles, making it desirable for a user to be able to pivot the display, both horizontally and vertically. These factors work against the desire to provide a flexible mounting that allows a user to move the display to maximize viewing.

Conventionally devices have generally provided two types of adjustment either mounting the display on an articulating arm, which can result in an enormous increase in force on the mount due to the leverage of having the display extended from the wall, or utilizing a tilting mechanism. However, both of these structures add to the size of the mount and reduce the benefit to having a flat panel display. A bulky mount with a flat panel display may result in a drastic increase in the necessary space and may also result in a less aesthetic presentation. Further, conventional mounts have typically been either been low profile, allowing for positioning the display close to a wall without significant adjustability, or have provided a high degree of adjustability and freedom of movement for the display but via the use of bulky structures, preventing positioning of the display close to the wall.

SUMMARY OF THE INVENTION

One embodiment of the invention relates to an articulating mount comprising a surface mount, an articulation mechanism, and a device mount plate. The surface mount has an upper surface bracket, a lower surface bracket and a vertical support positioned there between and connected to the lower surface bracket and the upper surface bracket. The articulation mechanism has an inner articulating arm and an outer articulating arm. The inner articulating arm has a void therein and pivotally affixed at a first inner articulating arm end to the surface mount. The inner articulating arm is rotatably affixed at a second inner articulating end to a first end of the outer articulating arm. The inner articulating arm is adapted to pivot in relation to the surface mount about a first axis to a position substantially parallel to the surface mount. The outer articulating arm is adapted to rotate in relation to the inner articulating arm about a second vertical axis to a position within the void of the inner articulating arm substantially parallel to the surface mount. The device mount plate is adapted to have a device mounted thereto. The device mount is pivotally affixed to a second end of the outer articulating arm. The inner articulating arm is pivotable about a first vertical axis with regard to the surface mount, the outer articulating arm is rotatable about a second vertical axis with regard to the inner articulating arm, and the device mount plate is pivotable about a third vertical axis with regard to the outer articulating arm.

In a further embodiment, a height adjustment block is provided in communication with the device mount plate adapted to adjust height of the device mount plate relative to the surface bracket. The height adjustment block may be adapted to pivot about a third vertical axis in relation to the outer articulating arm. The height adjustment block is pivotally connected to the device mount plate via an upper tilt mount pivotable about a first horizontal axis and a lower tilt mount each pivotable about a second horizontal axis such that the device mount plate is tiltable about a third horizontal axis. The inner articulating arm is positionable substantially co-planar with the surface bracket and the outer articulating arm is rotatable such that it is substantially disposed within the inner articulating arm and co-planar therewith.

Yet another embodiment of the invention relates to an articulating mount comprising a surface mount, an articulation mechanism, a tilt assembly and a device mount plate. The articulation mechanism has an inner articulating arm and an outer articulating arm. The inner articulating arm is rotatably affixed at a second inner articulating end to a first end of the outer articulating arm. The inner articulating arm is adapted to pivot in relation to the surface mount about a first axis to a position substantially parallel to the surface mount. The outer articulating arm is adapted to rotate in relation to the inner articulating arm about a second vertical axis. The tilt assembly is rotatably affixed to the outer articulating arm and adapted to rotate about a third vertical axis. The tilt assembly includes at least one friction hinge assembly, each including a shaft that is resistively rotatable about a horizontal axis. The shaft is attached to the device mount plate that is adapted to have a device mounted thereto and is selectively tiltable in relation to the tilt assembly. The friction hinge assembly is configured to substantially maintain the tilt orientation of the device mount plate and attached device.

These and other features of the invention, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 4A is a perspective view of the lower surface mount bracket; FIG. 4B a view of the front-side of the lower surface mount bracket; FIG. 4C is a side view of the lower surface mount bracket; FIG. 4D is a back-side view of the lower surface mount bracket; FIG. 4E is a cross-sectional view of lower surface mount bracket along line A-A of FIG. 4D; FIG. 4F is a end view of the lower surface mount bracket;

FIG. 5A is a perspective view of the vertical support; FIG. 5B is a back-side view of the lower surface mount bracket; FIG. 5C is a end view of the lower surface mount bracket;

FIGS. 6A-E illustrate an inner articulating arm used in the device mount of FIG. 1; FIG. 6A is a perspective view of the inner articulating arm; FIG. 6B a side view of the inner articulating arm; FIG. 6C is a cross-sectional view of the inner articulating arm along line A-A of FIG. 6B; FIG. 6D is a top view of the inner articulating arm; FIG. 6E is a side view of a slot for receiving the shaft clamp block;

FIGS. 7A-D illustrate an outer articulating arm used in the device mount of FIG. 1; FIG. 7A is a perspective view of the outer articulating arm; FIG. 7B a side view of the outer articulating arm; FIG. 7C is a cross-sectional view of the outer articulating arm along line A-A of FIG. 7B; FIG. 7D is a top view of the outer articulating arm;

FIG. 8A is a perspective view of the articulating shaft; FIG. 8B is a side view of the articulating shaft; FIG. 8C is an end view of the articulating shaft;

FIG. 9A is a perspective view of the shaft clamp block; FIG. 9B is a side view; FIG. 9C is a bottom view of the shaft clamp block; FIG. 9D is the opposite side view of the shaft clamp block; FIG. 9E is a top view of the shaft clamp block;

FIG. 10A is a perspective view of the height adjusting block; FIG. 10B is a side-view of the height adjusting block; FIG. 10C is a back-side view of the height adjusting block; FIG. 10D is a top view of the height adjusting block;

FIG. 11A is a perspective view of the adjusting screw; FIG. 11B is an end view of the adjusting screw; FIG. 11C is a cross-sectional view along line A-A of FIG. 11B;

FIG. 12A is a perspective view of the lower tilt mount; FIG. 12B is a side view of the lower tilt mount; FIG. 12C is a back-side view of the lower tilt mount; FIG. 12D is a top view of the lower tilt mount; FIG. 12E is a plan view of a stamped component prior to bending such as during stamping manufacturing;

FIG. 13A is a perspective view of the upper tilt mount; FIG. 13B is a side view of the upper tilt mount; FIG. 13C is a back-side view of the upper tilt mount; FIG. 13D is a top view of the upper tilt mount; FIG. 13E is a plan view of a stamped component prior to bending such as during stamping manufacturing;

FIGS. 14A-E illustrate a device mounting plate used in the device mount of FIG. 1; FIG. 14A is a perspective view of the device mounting plate; FIG. 14B is a front-side view of the device mounting plate; FIG. 14C is a cross-sectional view along line A-A of FIG. 14B; FIG. 14D is a top view of the device mounting plate; FIG. 14E is a plan view of a stamped component prior to bending such as during stamping manufacturing;

FIGS. 15A-D illustrate the device mount in a collapsed position; FIG. 15A is a perspective view of the device mount; FIG. 15B is a plan view of the device mount; FIG. 15C is a top view of the device mount; FIG. 15D is a side view of the device mount;

FIG. 17 is a perspective view of the device mount of FIG. 1 having the articulation mechanism fully extended;

FIG. 18A illustrates a perspective view of the display; FIG. 18B illustrates a perspective view of the articulating mechanism and mounting plate; FIG. 18C is a close-up view of the connection of the outer articulating arm, height adjusting block, lower tilt bracket, upper tilt bracket, and mounting plate;

FIG. 19A is a plan view of a device mount affixed a distance from the corner; FIG. 19B is a plan view of a device mount affixed adjacent the corner; FIG. 19C is a plan view of the display articulated around the corner;

FIGS. 20A-C illustrate a device mount that is both articulated and tilted; FIG. 20A is a perspective view of an articulated and tilted display; FIG. 20B is a view of the articulated and tilted device mount supporting the display of FIG. 20A; FIG. 20C is a close-up of the connection of the outer articulating arm, height adjusting block, lower tilt bracket, upper tilt bracket, and mounting plate;

FIG. 23 is an exploded view showing a tilt assembly of the device mount of FIG. 21A;

FIG. 27 is an exploded view showing a tilt assembly of the device mount of FIG. 26A.

DETAILED DESCRIPTION OF VARIOUS EMBODIMENTS

Figure 1:
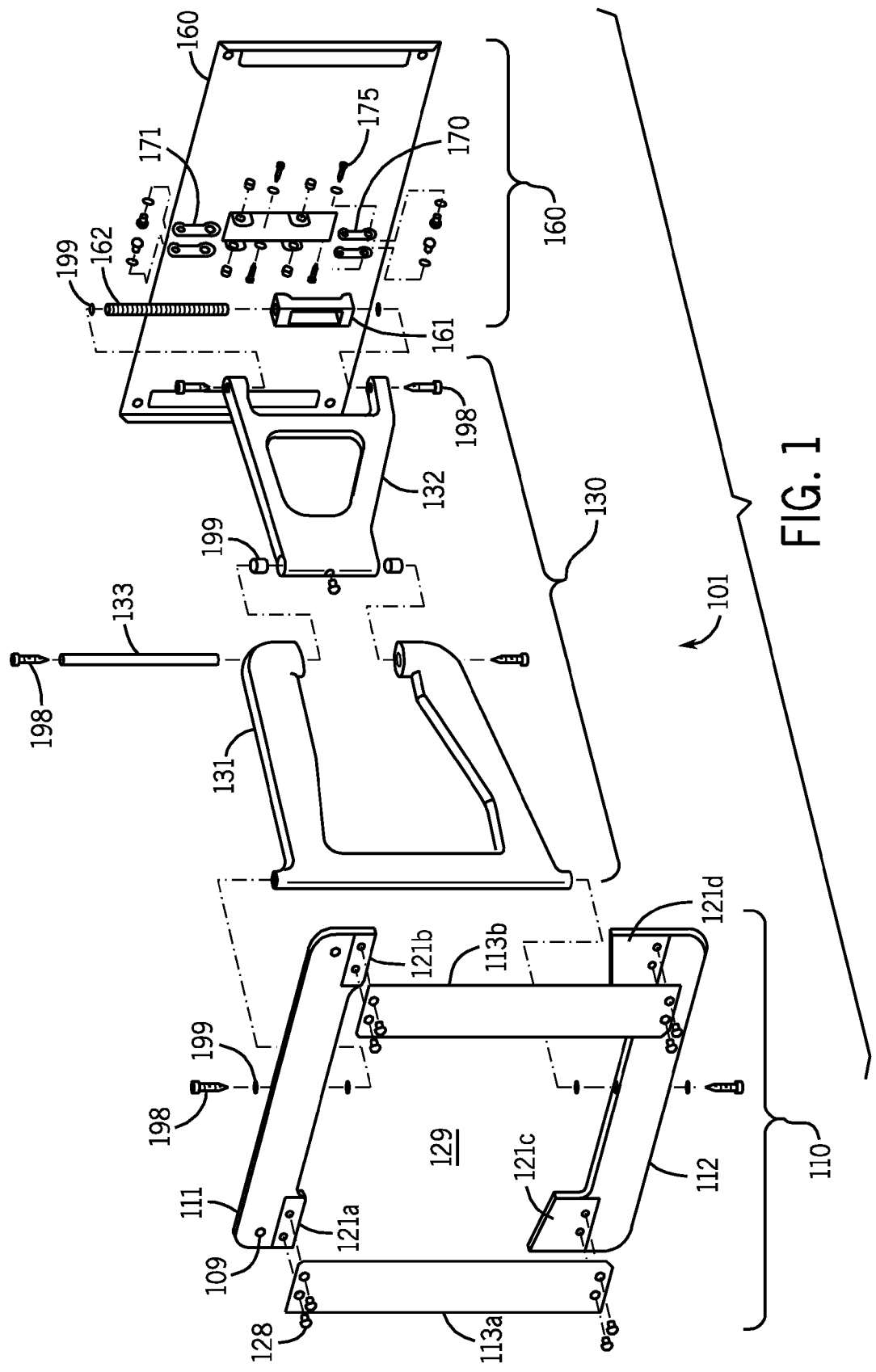
FIG. 1 is an exploded perspective view of one embodiment of a device mount.

Various embodiments of the present invention provide for a low profile articulating mounting system. With reference to FIG. 1, an exploded perspective view of one embodiment of a device mount 101 is shown. The device mount 101 includes a surface bracket 110 (further shown in FIGS. 2-5B), an articulating mechanism 130 (further shown in FIGS. 6A-9E), and a device mounting plate 160 (further shown in FIG. 10A-14E) upon which a display 10 may be mounted. The device mount 101 includes an extended position (FIG. 1) and a collapsed position (FIG. 2) as well as a plurality of positions there between. Although a flat panel display is illustrated in certain figures, one of ordinary skill in the art will appreciate that various devices may be utilized with the device mount 101.

Figure 2:
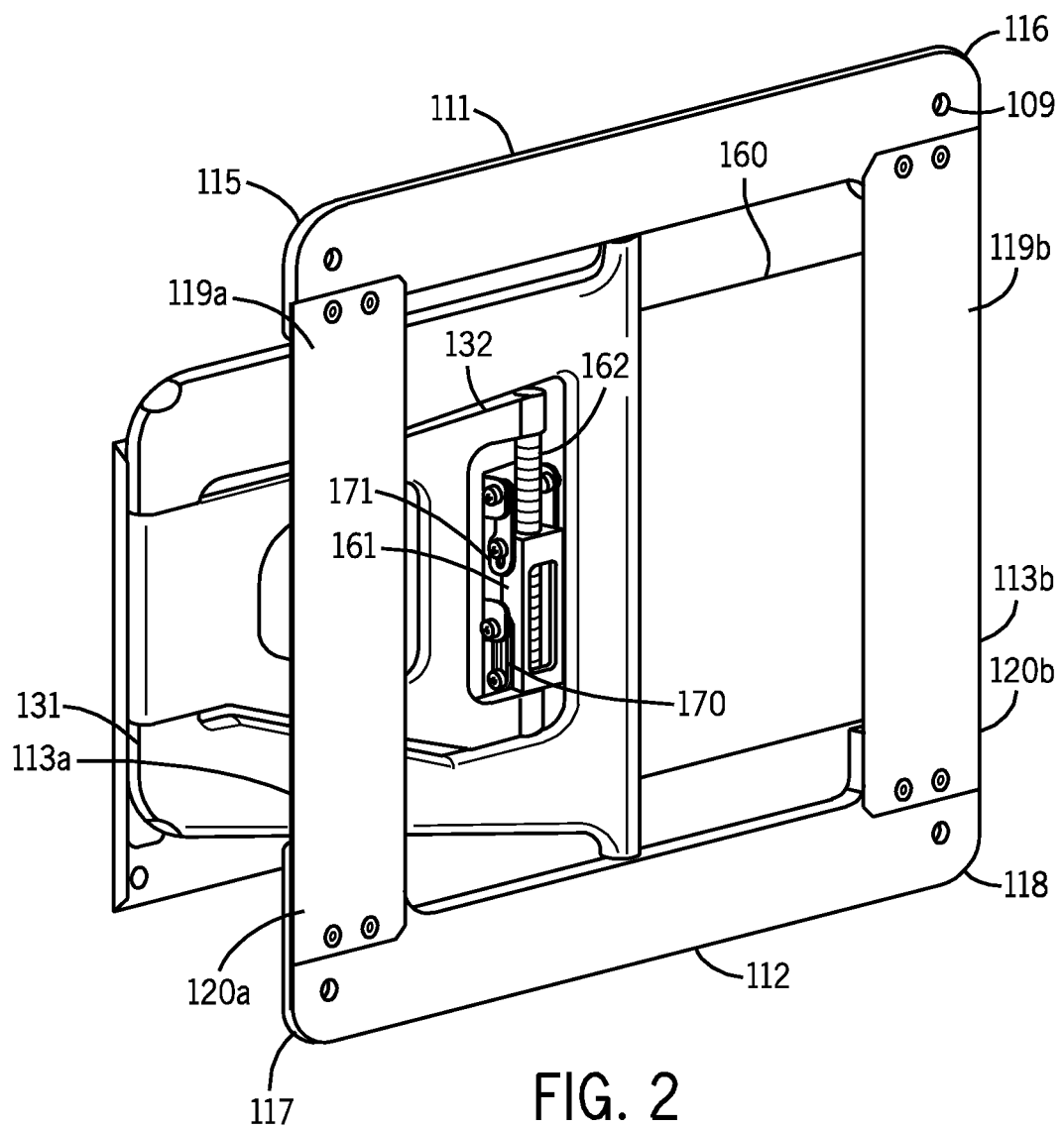
FIG. 2 is a perspective view of the device mount of FIG. 1.
Figure 3A:
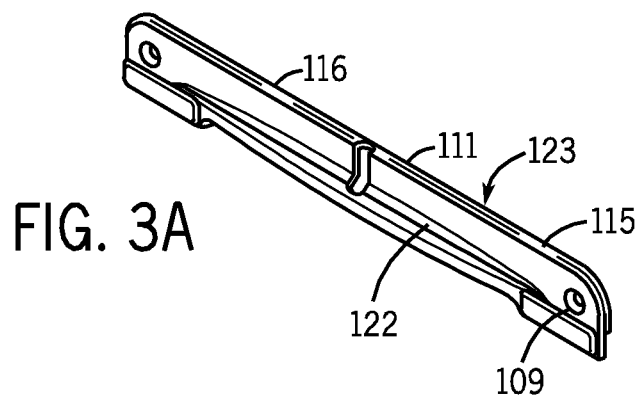
FIG. 3A is a perspective view of the upper surface mount bracket used in the device mount of FIG. 1.
Figure 3B:
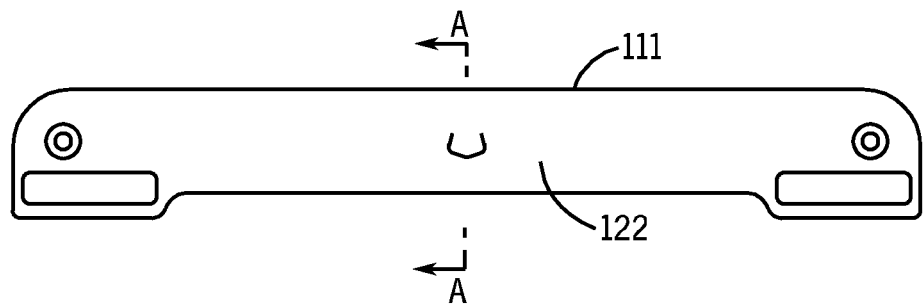
FIG. 3B a view of the front-side of the upper surface mount bracket.
Figure 3C:
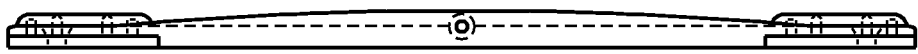
FIG. 3C is a side view of the upper surface mount bracket.
Figure 3D:
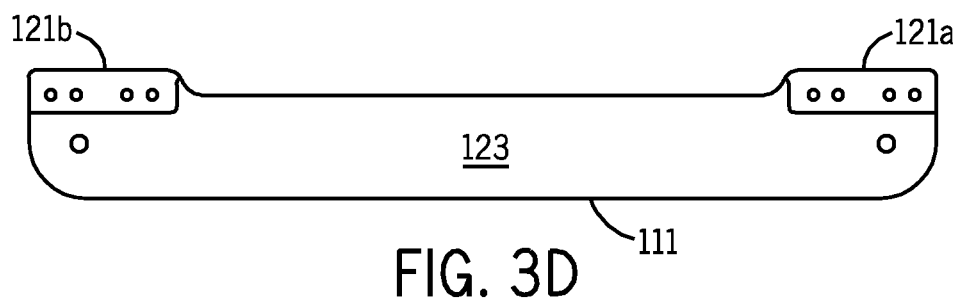
FIG. 3D is a back-side view of the upper surface mount bracket.
Figure 3E:
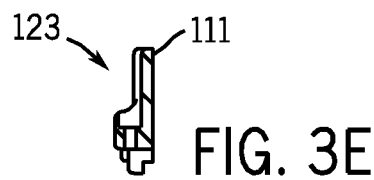
FIG. 3E is a cross-sectional view of upper surface mount bracket along line A-A of FIG. 3B.
Figure 4A:
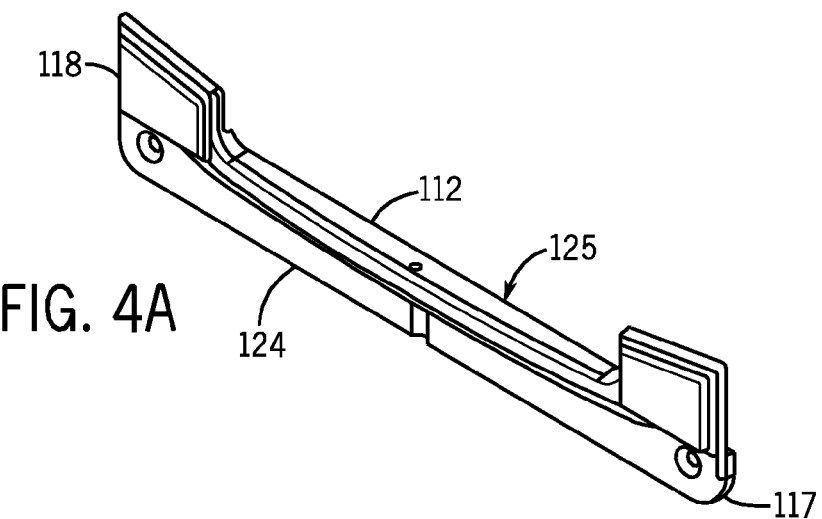
FIGS. 4A-F illustrate a lower surface mount bracket used in the device mount of FIG. 1.
Figure 4B:
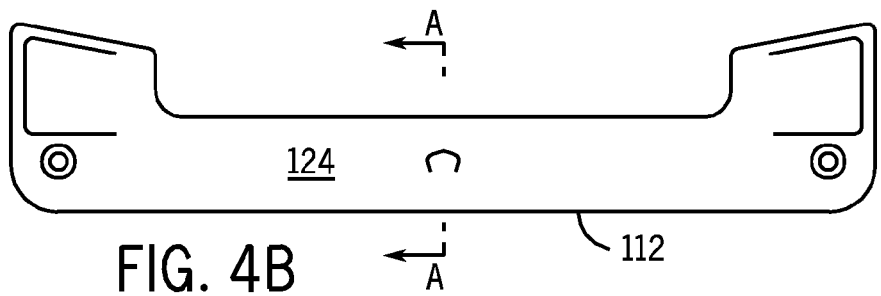
Figure 4C:
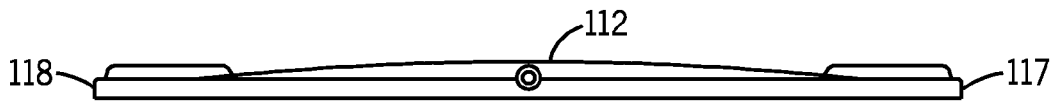
Figure 4D:
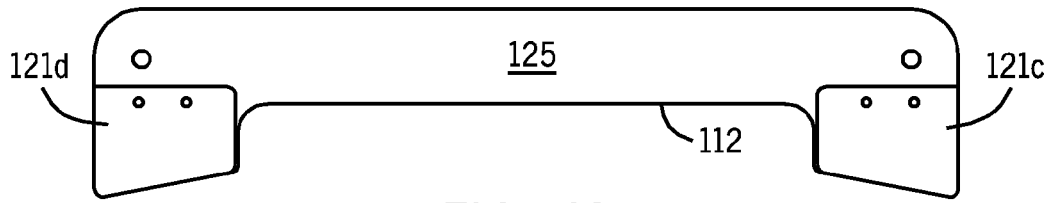
Figure 4E:
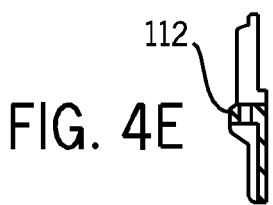
Figure 4F:
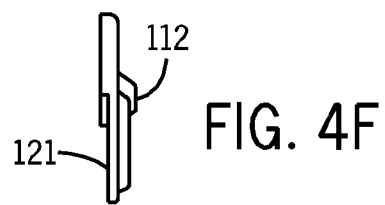

With regard to the surface bracket 110, FIG. 2 illustrates a perspective view of the device mount 101 with the surface bracket 110 in the foreground. FIGS. 19A-B and 20B illustrate embodiments wherein the surface bracket 110 is affixed to a wall 20. The surface bracket 110 functions to anchor the device mount 101 and a connected display 10 to the wall 20 (as best shown in FIGS. 18A-20B). It should be appreciated that the surface bracket 110 may have holes 109 (FIG. 1) for enabling connection of the surface bracket 110 to the wall 20.

Figure 5A:
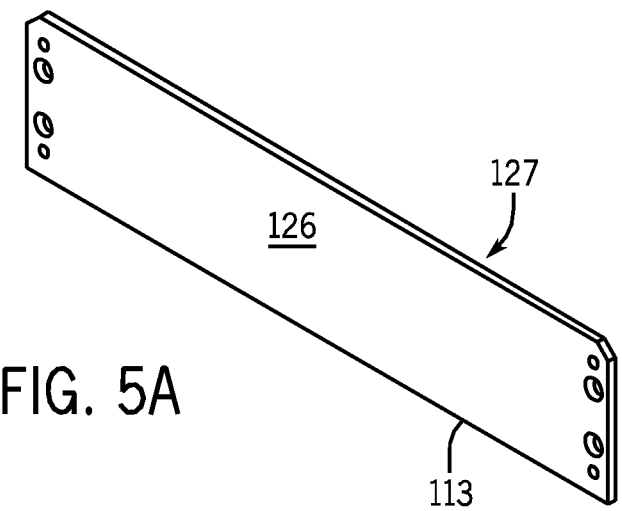
FIGS. 5A-C illustrate a vertical support used in the device mount of FIG. 1.
Figure 5B:
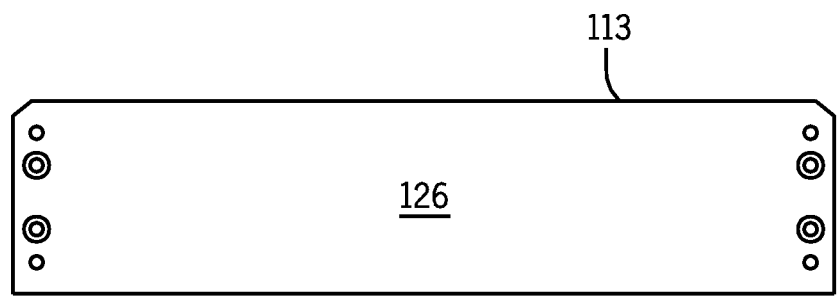
Figure 5C:
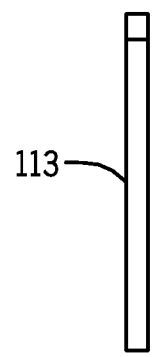

In the embodiment shown in FIGS. 1 and 2, the surface bracket 110 includes an upper surface bracket 111 (as best shown in FIGS. 3A-D), a lower surface bracket 112 (as best shown in FIGS. 4A-D), and a vertical support 113 (as best shown in FIGS. 5A-B). The upper surface bracket 111 includes a first upper surface bracket end 115 and a second upper surface bracket end 116. The lower surface bracket 112 includes a first lower surface bracket end 117 and a second lower surface bracket end 118. The vertical support 113 includes a first vertical support end 119 and a second vertical support end 120. The upper surface bracket 111 is connected to the lower surface bracket 112 via the vertical support 113. In the illustrated embodiment, two vertical supports 113a and 113b are utilized. The first end 119a of the first vertical support 113a is engagable with the first end 115 of the upper surface bracket 111 and the second end 120a of the vertical support 113a is engagable with the first end 117 of the lower surface bracket 112. Furthermore, the first end 119b of the second vertical support 113b is engagable with the second end 116 of the upper surface bracket 111 and the second end 120b of the vertical support 113b is engagable with the second end 118 of the lower surface bracket 112. In one embodiment, the upper surface bracket 111, the first vertical support 113a, the second vertical support 113b, and the lower surface bracket 112 form a substantially rectangular shape.

In the embodiment illustrated in FIGS. 1 and 2, the upper surface bracket 111 and the lower surface bracket 112 include a thinned region 121 for receiving the vertical support 113. The thinned regions 121 may comprise areas of reduced thickness such that the vertical support 113 overlaps with the upper surface bracket 111 and lower surface bracket 112 without substantially increase the distance the surface bracket 110 protrudes from the wall 20. The embodiment of FIG. 1 comprises four such regions 121a-d, corresponding to the first end 115 and second end 116 of the upper surface bracket 111 and to the first end 117 and second end 118 of the lower surface bracket 112. The vertical support 113 may be affixed to the upper surface bracket 111 and/or lower surface bracket 112 in the thinned region 121 via fixation means 128 known in the art, including but not limited to adhesives, welding, rivets, pins and bolts. In the illustrated embodiment, the upper surface bracket 111 and the lower surface bracket 112 each have a respective thickness and the thinned regions 121 have a reduced thickness such that when the vertical support 113 is positioned within the vertical support engagement regions 121, the thickness of the upper surface bracket 111 (or lower surface bracket 112) and the vertical support 113 is not greater than that of the thickest portion of the upper surface bracket 111 (or lower surface bracket 112).

In certain embodiments, such as depicted in FIG. 2, the upper surface bracket 111 and the lower surface bracket 112 protrude, when affixed to the wall 20, from the wall 20 more than the vertical support 113. Thus, a region 129 is formed between the upper surface bracket 111 and the lower surface bracket 112 and containing the vertical support 113, which has a lower profile (smaller thickness) than the upper surface bracket 111 and the lower surface bracket 112.

As shown in FIGS. 3A-5B, the upper surface bracket 111 has a front portion 122 and a back portion 123, the lower surface bracket 112 has a front portion 124 and a back portion 125, and the vertical support 113 has a front portion 126 and a back portion 127. The back portions 123, 125, 127 are proximate the wall 20 when the device mount 101 is affixed to the wall 20. The regions 121a-d comprise a recess or notch in the respective back portions 123, 125 of the upper surface bracket 111 and lower surface bracket 112. The front portion 126 of the vertical support is positioned against the back portions 123, 125 of the upper surface bracket 111 and lower surface bracket 112, respectively.

Figure 8A:
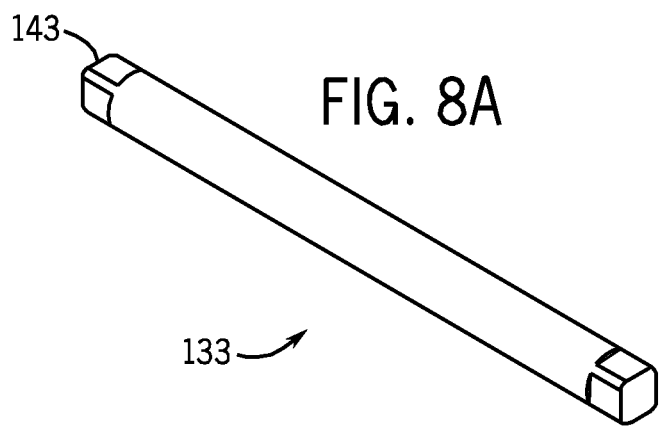
FIGS. 8A-C illustrate an articulating shaft used in the device mount of FIG. 1.
Figure 8B:
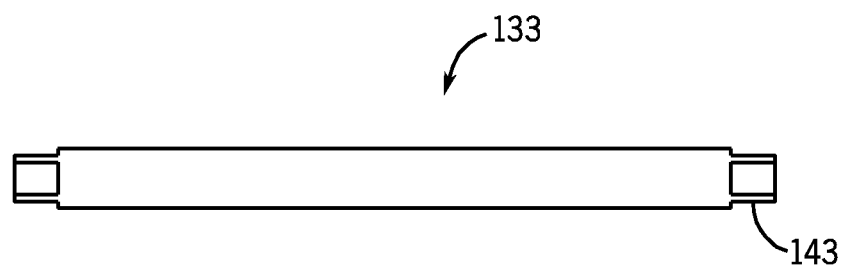
Figure 8C:
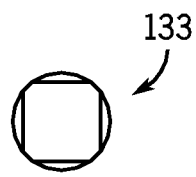

With regard to the articulating mechanism 130, FIG. 1 illustrates an embodiment wherein the articulating mechanism comprises an inner articulating arm 131 (as best shown in FIGS. 6A-E), an outer articulating arm 132 (as best shown in FIGS. 7A-D), an articulation shaft 133 (as best shown in FIGS. 8A-C), and a shaft clamp block 134 (as best shown in FIGS. 9A-E). As shown in FIG. 1, the inner articulating arm 131 is pivotally connected to the surface bracket 110 and adapted to pivot about a first pivot axis 190 with, in one embodiment, a range of substantially 180 degrees. The first pivot axis 190 is substantially in a plane defined by the surface bracket 110, allowing the inner articulating arm 131 to be folded parallel to the surface bracket 110 and to be substantially co-planar therewith. In one embodiment, the inner articulating arm 131 is pivotally connected at a first surface bracket pivot point 134 on the upper surface bracket 111 and at a second surface bracket pivot point 135 on the lower surface bracket 112. In a further embodiment, the inner articulating arm 131 is pivotally connected to the lower surface bracket 112 and the upper surface bracket 112 substantially in the middle thereof.

FIGS. 6A-E illustrate various views of the inner articulating arm 131. FIG. 6A illustrates a perspective view of the inner articulating arm 131 unattached to the surface bracket 110 or the outer articulating arm 132. FIG. 6B illustrates a side view of the inner articulating arm 131. FIG. 6C is a cross-sectional view along line A-A. FIG. 6D is bottom view of the inner articulating arm 131. The inner articulating arm 131 has a thin thickness such that the inner articulating arm 131 can articulate to be substantially parallel with the surface bracket 110. In one embodiment, the inner articulating arm has a thickness less than or equal to that of the upper surface bracket 111 and/or the lower surface bracket 112. The inner articulating arm 131, as shown in FIG. 1, is thus positioned within the region 129 between the upper surface bracket 111 and the lower surface bracket 112 and adjacent the front portion 126 of the vertical support 113. In this embodiment, the thickness of the inner articulating arm is sufficiently thin such that the inner articulating arm 131 and surface bracket 110 extend substantially the same distance from the wall 20.

As illustrated in FIGS. 6A and 6B, the inner articulating arm 131 includes a central void 159 adapted to receive the outer articulating arm 132. In one embodiment, the connection of the inner articulating arm 131 and the outer articulating arm is such that they are rotatable relative to each other about 360 degrees. The outer articulating arm 132 can rotate to a position where it is substantially co-planar with the inner articulating arm 131 and disposed within the void 159 of the inner articulating arm 131. As can be seen, for example, in FIG. 2, the outer articulating arm 132 "nests" within inner articulating arm 131, and the articulating mechanism 130 nests between the upper surface bracket 111 and the lower surface bracket 112 proximate the vertical support 113. Thus, in one embodiment, the collapsed articulation mechanism 130 has a thickness no greater than that of the thicker of the inner articulating arm 131 or the outer articulating arm 132.

The inner articulating arm 131 and the outer articulating arm 132 are pivotally connected via a pivoting mechanism such as articulation shaft 133 allowing rotation about a second vertical axis 191. In one embodiment, the inner articulating arm 131 includes a base 136 and two protruding inner articulating portions 137a, 137b. The base 136 is pivotally affixed to the surface bracket 110. The protruding inner articulating portions 137a, 138b extend therefrom such that first ends 138a, 138b of the portions 137a, 137b are adjacent and connected to the inner articulating arm base 136 and second ends 139a, 139b of the portions 137a, 138b extend away from the base and are adapted to receive the articulation shaft 133. The void 159 is defined by the base 136, and the two portions 137a, 137b.

In one embodiment, the two portions 137a, 137b include at their respective second ends 139a, 139b a slot 141a, 141b for receiving the articulation shaft 133. In a further embodiment, shaft clamp blocks 142 are adapted to retain the articulation shaft 133 within the slots 141a, 141b. The second ends 139a, 139b of the two portions 137a, 137b may be curved towards the respective opposite portion 137a, 137b such that the slots 141a, 141b are disposed opposite each other for positioning of the articulation shaft 133 there between.

FIGS. 7A-D illustrate an embodiment of the outer articulating arm 132. The outer articulating arm 132 is pivotally connected with the inner articulating arm 131 and the device mounting plate 160. The outer articulating arm 132 may include a base 152 and a first extending portion 148 and a second extending portion 149, each having a first end 153, 154 adjacent the base 152 and a second end 155, 156 distal to the base 152. Further, an outer articulating arm vertical support 157 may be positioned between the base 152 and the second end 155, 156 of the outer articulating arm portions 148, 149. In one embodiment, the base 152 and the second ends 155, 156 of the outer articulating arm first and second portion 148, 149 include bores 150, 151 respectively there through, parallel to the wall 20 when the device mount 101 is affixed to the wall 20. The articulation shaft 133 extends through the bore 150 in the first end 148 terminating in the first ends 139a, 139b of the first portions 137a, 137b, thus retaining the outer articulating arm 132 pivotally in regard to the inner articulating arm 131 and defining the second vertical axis 191.

FIGS. 8A-C illustrate an embodiment of the articulation shaft 133. FIG. 8A is a perspective view, FIG. 8B is a side-view and FIG. 8C is an end-view. The embodiment of the articulation shaft 133 shown in FIG. 8A-C is substantially cylindrical with a squared-off portion 143 on each end. The squared-off portion is adapted to engage a corresponding opening 144 in the shaft clamp block 142 to retain the articulation shaft 133.

Figure 9A:
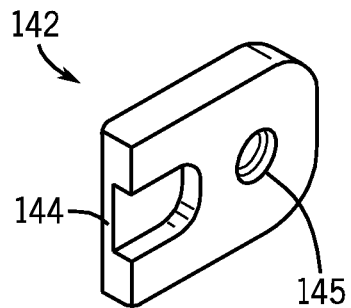
FIGS. 9A-E illustrate the shaft clamp block used in the device mount of FIG. 1.
Figure 9B:
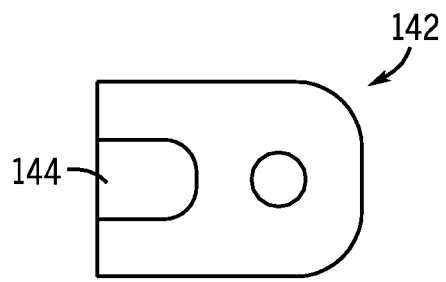
Figure 9C:
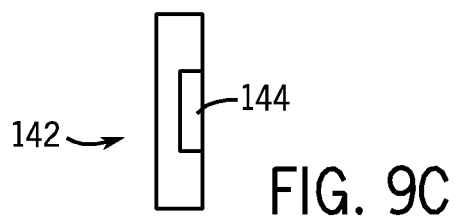
Figure 9D:
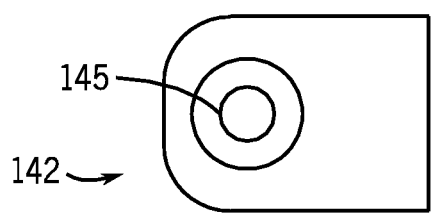
Figure 9E:
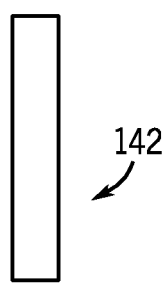

FIGS. 9A-E illustrate a shaft clamp block 142 for use in certain embodiments. FIG. 9A is a perspective view of one embodiment of the shaft clamp block 142. FIG. 9B illustrates a side-view, FIG. 9C illustrates a top-view, FIG. 9D illustrates the other side-view, FIG. 9E illustrates a bottom-view. The shaft clamp block 142 shown in FIGS. 9A-E includes the opening 144 and a hole 145 for receiving a screw or bolt to fix the shaft clamp block 142 to the portion 147a, 147b.

The articulating mechanism 130 is adapted to provide motion along a plane. For example, where the surface bracket 110 is affixed to the wall 20, the articulating mechanism 110 allows translation along a plane perpendicular to the wall 20. The articulating mechanism 130 may pivot from extending in first direction along the wall 20 substantially parallel to the surface bracket 110 to a position approximately 90 degrees therefrom and substantially perpendicular to the wall 20 and surface bracket 110 to a position approximately 90 degrees therefrom extending substantially parallel to the mounting bracket in an opposite direction as the initial position. It should be appreciated any of the positions there between are also possible. Further, the relation of the inner articulating arm 131 and the outer articulating arm 132 may be adjusted to alter the distance the device mounting plate 160 is spaced from the wall 20. Thus, a display 10 or other object is positionable at any position within the region defined by the path the device mounting plate 160 can transverse from extending one direction along the wall 20 to extending the other direction along the wall 20.

In addition, the articulation mechanism 130 allows for the collapsed position (FIG. 2) wherein the inner articulating arm 131 is positioned proximate to the wall and extending in a first direction substantially parallel thereto and the outer articulating arm 132 is also positioned proximate the surface bracket 110 and substantially parallel thereto, but extending in the opposite direction as the inner articulating arm 131 such that the outer articulating arm folds back over the inner articulating arm 131. In the collapsed position, the outer articulating arm 132 is positioned within the void 156 of the inner articulating arm 131.

Figure 10A:
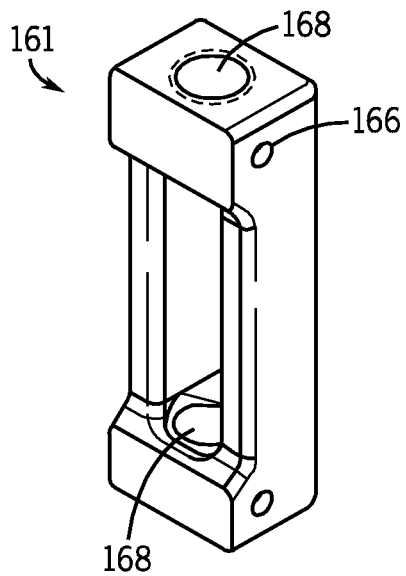
FIGS. 10A-D illustrate a height adjusting block used in the device mount of FIG. 1.
Figure 10B:
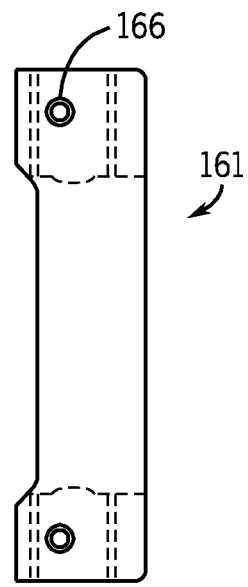
Figure 10C:
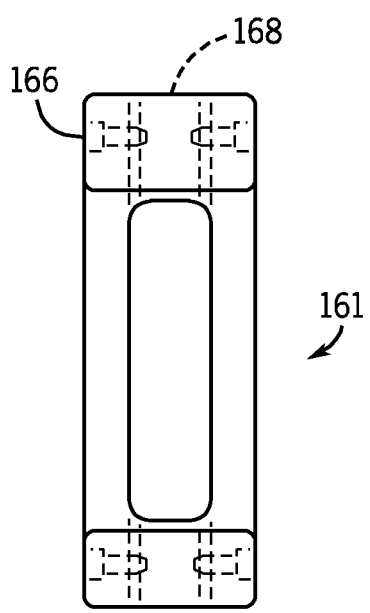
Figure 10D:
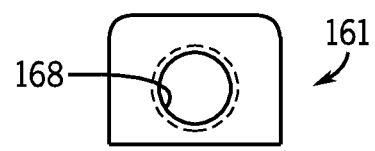

With regard to the device mounting plate 160, FIG. 1 and FIG. 2 illustrate a mechanism for providing an adjustable connection between the outer articulating arm 132 and the device mounting plate 160. As shown in FIGS. 10A-D, a height adjustment block 161 is connected to the outer articulating arm 132. FIG. 10A is a perspective view of the height adjustment block 161, FIG. 10B is a side-view, FIG. 10C is a back-view, and FIG. 10A is a top view. The height adjustment block 161 defines a third vertical axis 192. In the illustrated embodiment, the height adjustment block 161 is adapted to pivot almost a full 360 degrees such that the plate 160 is positioned substantially parallel to the outer articulating arm 132.

Figure 11A:
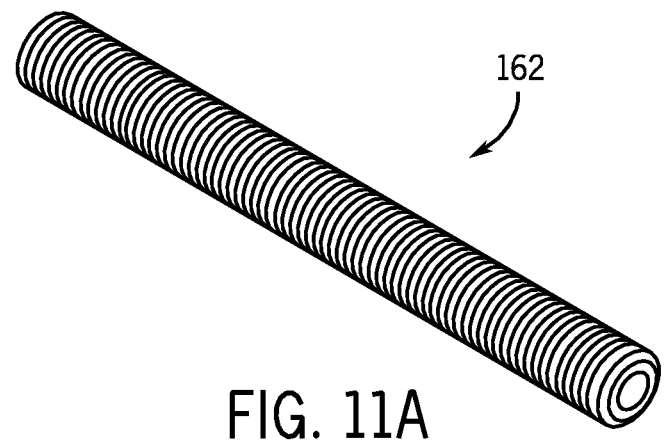
FIGS. 11A-C illustrate an adjusting screw used in the device mount of FIG. 1.
Figure 11B:
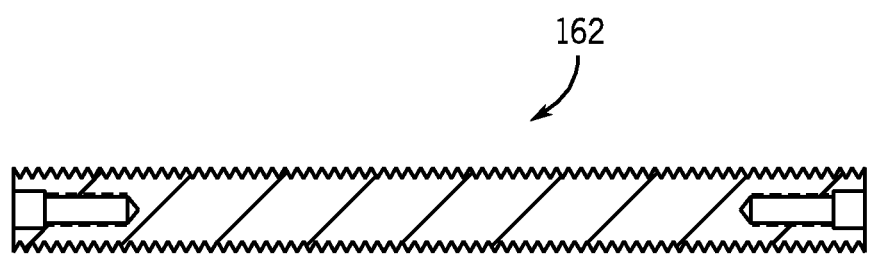
Figure 11C:
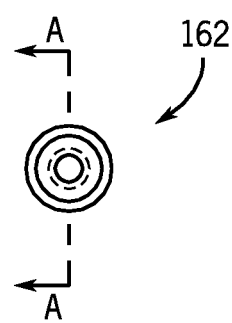

In one embodiment, the height adjustment block 162 includes an adjusting screw disposed through a threaded bore 168 therein for adjusting the height of the device mounting plate 160 (and of a device, when attached thereto). The adjusting screw 162 may be disposed in the height adjusting block 161, with the adjusting screw 162 affixed at one end 163 to the first portion 147a of the outer articulating arm 132 and at an other end 164 to the second portion 147b. Relative rotation of the height adjustment block 161 and the adjusting screw 162 moves the height adjustment block 161 along the length of the adjusting screw 162, thus changing the position of the height adjustment block 161 (and the device mounting plate 160 and display 10) in relation to the inner and outer articulating arms 131, 132 and surface bracket 110 (and wall 20). FIGS. 11A-C illustrates an embodiment of the adjusting screw 162. FIG. 10A is a perspective view, FIG. 10B is a cross-sectional view along the longitudinal axis and FIG. 10C is an end-view.

Figure 12A:
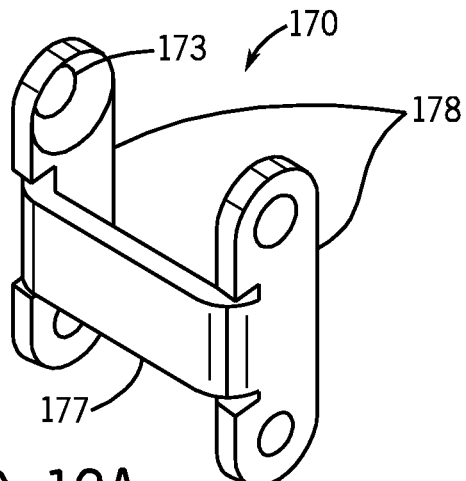
FIGS. 12A-E illustrate a lower tilt mount used in the device mount of FIG. 1.
Figure 12B:
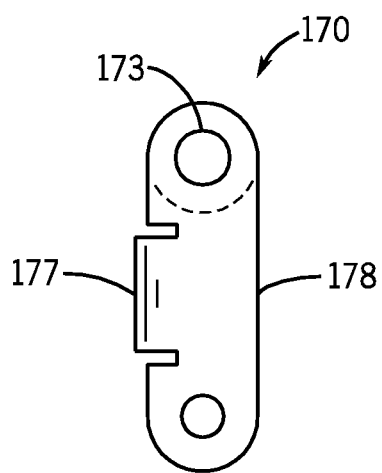
Figure 12C:
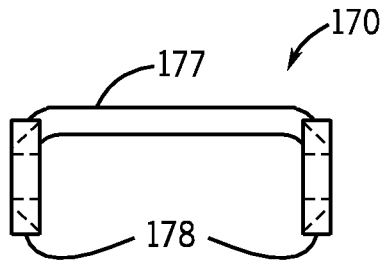
Figure 12D:
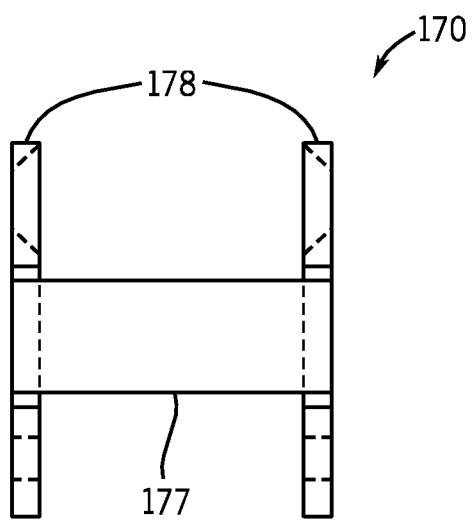
Figure 12E:
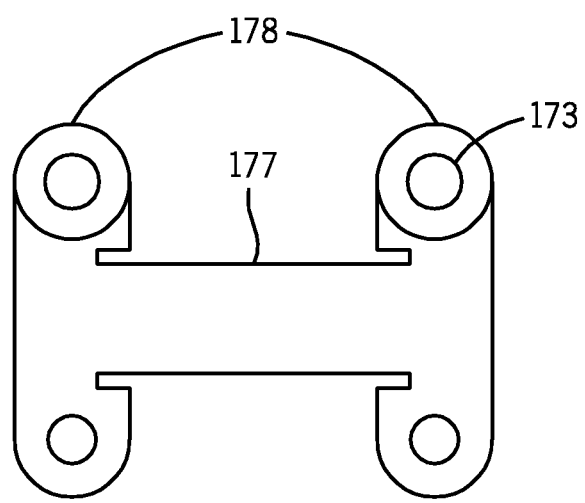
Figure 13A:
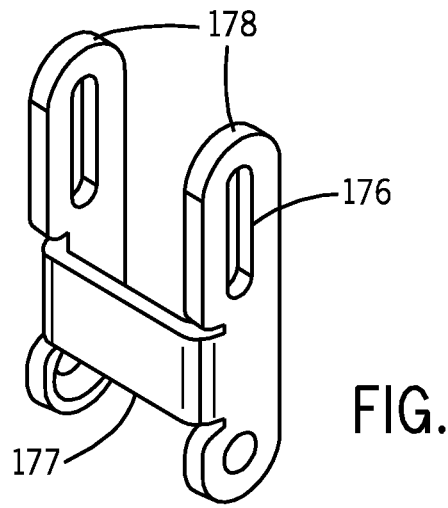
FIGS. 13A-E illustrate an upper tilt mount used in the device mount of FIG. 1.
Figure 13B:
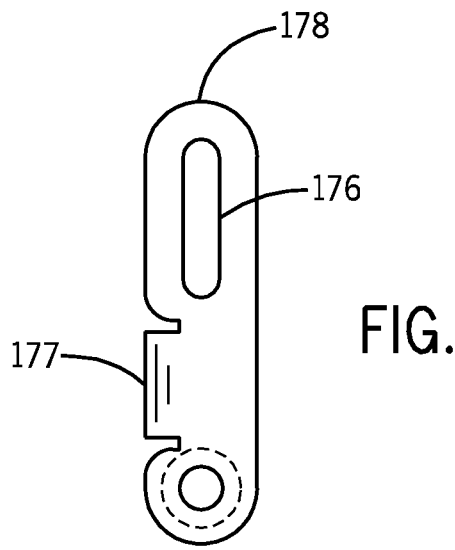
Figure 13C:
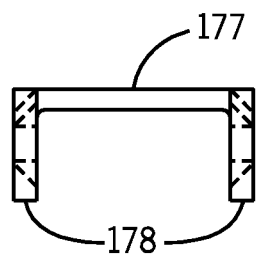
Figure 13D:
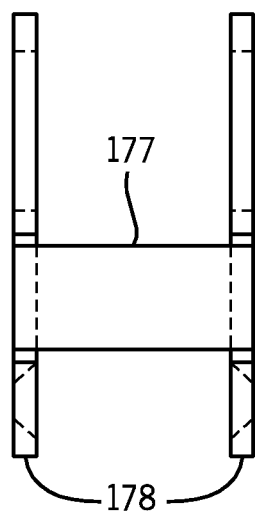
Figure 13E:
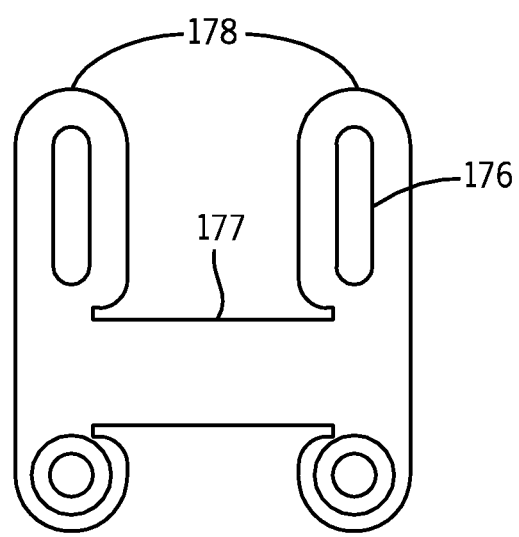
Figure 14E:
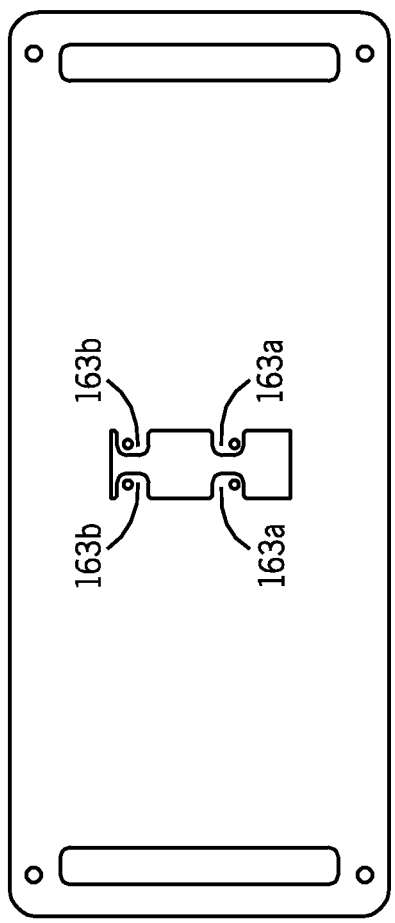

The height adjustment block is pivotally affixed to the device mounting plate 160. FIGS. 1 and 2 illustrate one embodiment wherein a lower tilt mount 170 (FIGS. 12A-E) and an upper tilt mount 171 (FIGS. 13A-E) connect the height adjustment block 161 to the device mounting plate 160. Returning to FIGS. 10A-C, the height adjustment block 161 includes a plurality of holes 166 for receiving a connection mechanism 128 such as, but not limited to, screws, pins, or bolts. As illustrated in FIGS. 12A and 13A, the lower tilt mount 170 and upper tilt mount 171 may comprise a pair of ties 178 connected by a horizontal support member 177.

The device mounting plate 160 is adapted to secure a display 10 to the outer articulating arm 132. In one embodiment, the device mounting plate includes a plurality of tabs 163 protruding from a back side 165 (which faces the wall 20 when the device mount 101 is affixed thereto) of the device mounting plate 160. The tabs 163 are engagable with the lower tilt mount 170 and the upper tilt mount 171. In one nonlimiting example, a first pair of tabs 163a is engagable with a slot or aperture 173 in the lower tilt mount 170 and a second pair of tabs 163b is engagable with a slot or aperture 173 in the upper tilt mount 171 such as by use of a bolt, pin, or screw 175. In one embodiment, the upper tilt mount 171 and/or the lower tilt mount 170 include elongated slots 176 for connection to the height adjustment block 161. It should be appreciated that elongated slots 176 and or the size of the lower tilt mount 170 and upper tilt mount 171 may be varied to allow a desired range of tilting to the device mount 101. The lower tilt mount 170 and the upper tilt mount 171 pivot about a first horizontal axis 193 and a second horizontal axis 194 such that the mounting plate 160 is pivotable about a variable horizontal axis 195.

Figure 15A:
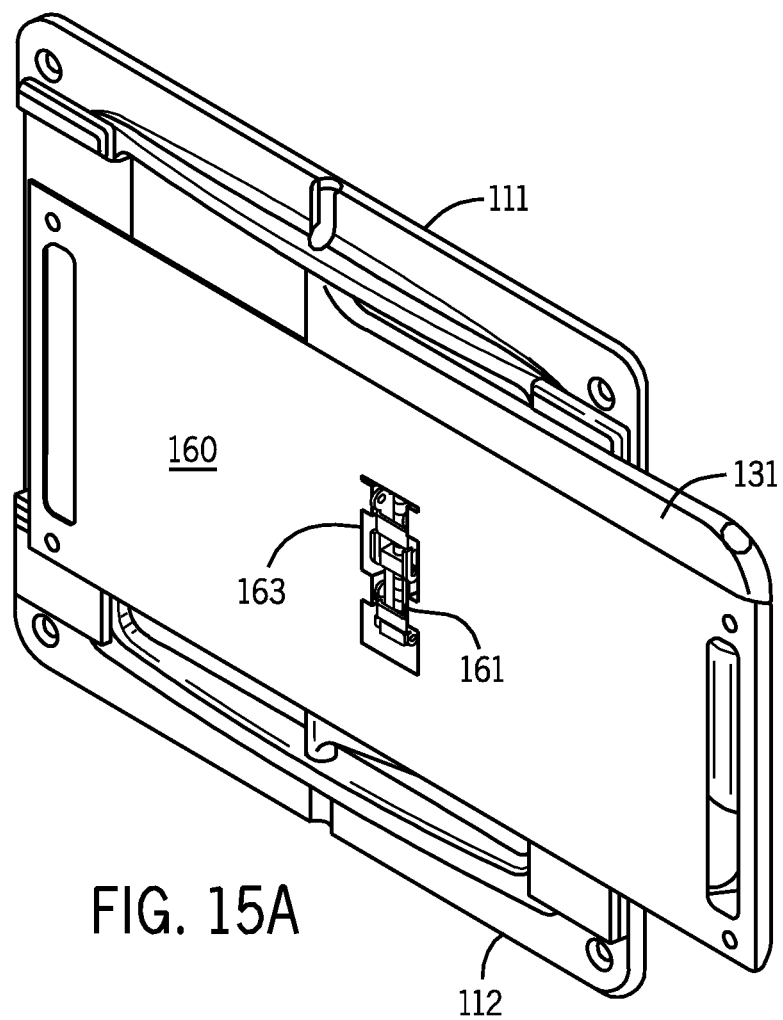
Figure 16:
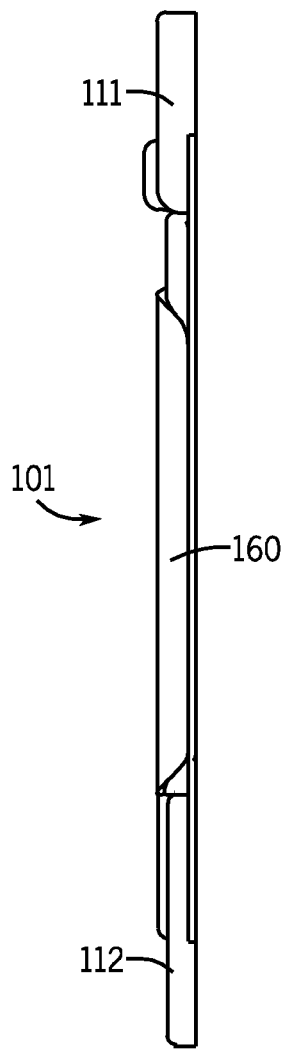
FIG. 16 is a side view of the device mount of FIG. 1.

The device mounting plate 160 is adapted to be positioned proximate the outer articulating arm 132 and substantially parallel thereto when in a collapsed position. Thus, in certain embodiments, where the device mount is in a collapsed position (FIG. 2), the device mounting plate 160 is positioned within the region 129 defined between the upper surface bracket 111 and the lower surface bracket 112 such that the entire actuation mechanism 130/device mounting plate 160 assembly extends from the wall 20 substantially the same or less than the upper surface bracket 111 and the lower surface bracket 112. FIGS. 2, 15E, and 16 illustrate the collapsed position of the device mount 101.

In the embodiment shown in FIGS. 1 and 2, the device mount 101 is adapted to be mounted to a vertical wall. It should be appreciated that one of ordinary skill in the art that the device mount 101 may be mounted to a wide variety of surfaces having various orientations, including, but not limited to structural components such as walls, ceilings, floors and free-standing components such as tables, stands, and pedestals. The articulating mechanism 130 pivots about a first vertical axis 190, a second vertical axis 191, and a third vertical axis 192 at three locations, respectively: the interface 180 of the inner articulating arm 131 to the surface bracket 110, at the interface 181 of the inner articulating arm 131 and the outer articulating arm 132, and at the interface 182 of the outer articulating arm 132 and the height adjustment block 161. Thus, these three interfaces 180, 181, 182 provide motion through a horizontal plane. The interface 183 between the height adjusting block 161 and the device mounting plate 160 allows pivoting about a horizontal axis 195 and tilting with respect to a vertical plane. In one embodiment, the pivoting about the axis 190, 191, 192, 195 is controlled via an adjustment feature that is adapted to be selectively adjusted to increase or decrease the ease of pivoting about the respective axis.

FIG. 16 illustrates a side view of the device mount 101 wherein the inner articulating arm 131 and the outer articulating arm 132 are pivoted toward the surface bracket 110 and substantially parallel thereto. In this position, the device mount 101 presents a thin profile. In one embodiment, the device mount 101 has a thickness of less than about one inch.

FIG. 17 illustrates an embodiment wherein the device mounting plate 160 is adapted to tilt with respect to the outer articulating arm 132 to which it is affixed. In one embodiment, the device mounting plate 160 is able to infinitely adjust between 0 to 15 degrees with respect to the outer articulating arm 132 (and, ultimately, the wall 20).

Figure 18B:
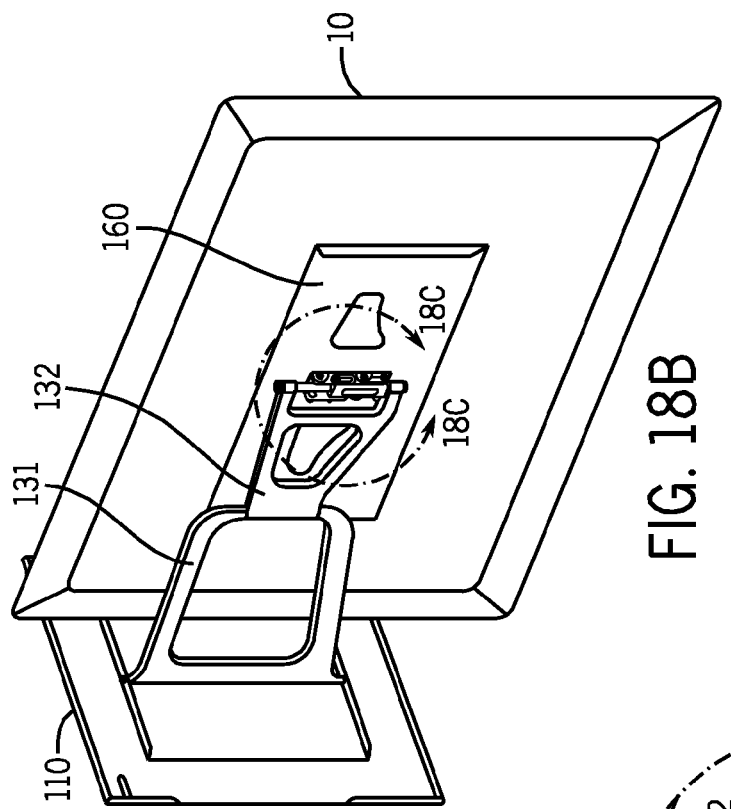
FIGS. 18A-18C illustrates a display attached to a device mount and pivoted perpendicular.
Figure 18C:
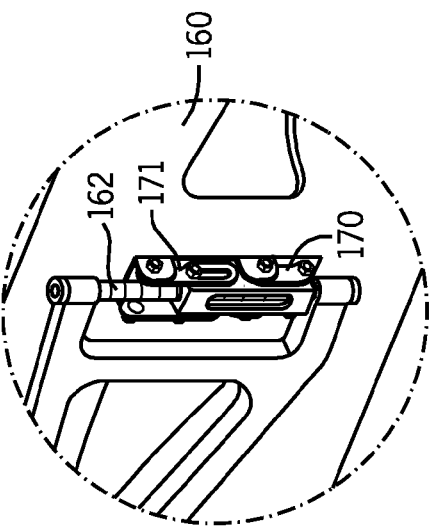
Figure 18A:
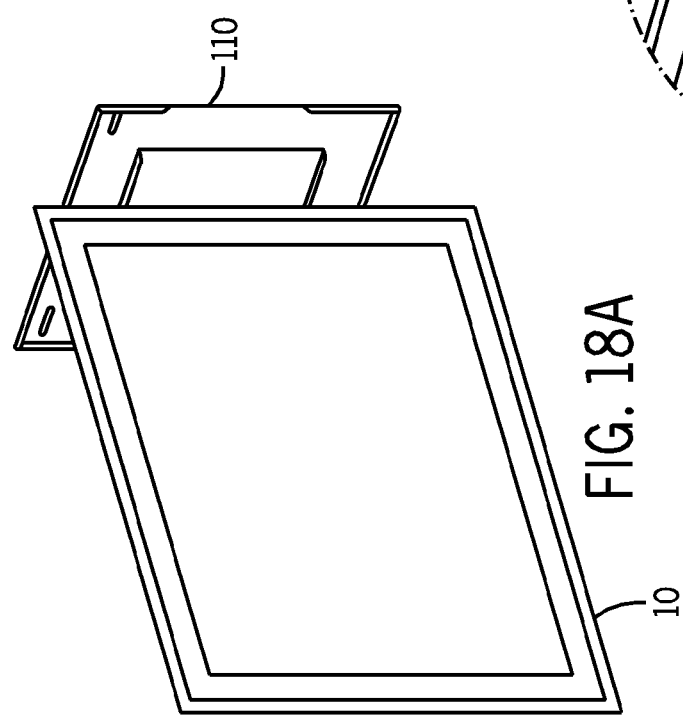

FIGS. 18A-18C illustrate one embodiment of a mechanism for adjusting the height of a display 10 attached to the device mount 101. As shown in FIGS. 18B and 18C, the height adjustment block 161 is adapted to travel vertically along the adjusting screw 162. It should be appreciated that the amount of adjustability to the height is related to the vertical spacing between the second end 155 of the outer articulating arm first portion 148 and the second end 156 of the outer articulating arm second portion 149, as well as the height of the height adjustment block 161. In one embodiment, a range of vertical adjustment is provided.

Figure 19C:
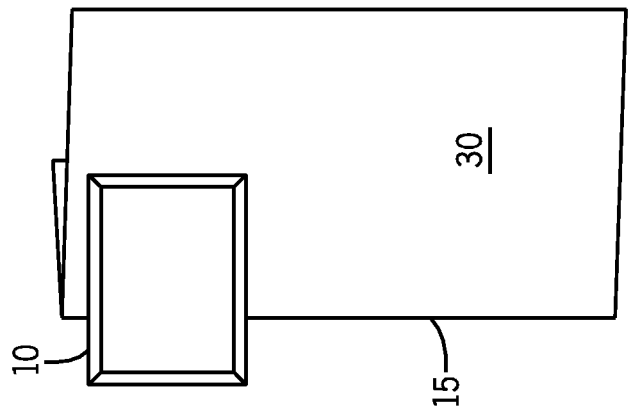
FIGS. 19A-C illustrate a display being articulated around a corner.
Figure 19B:
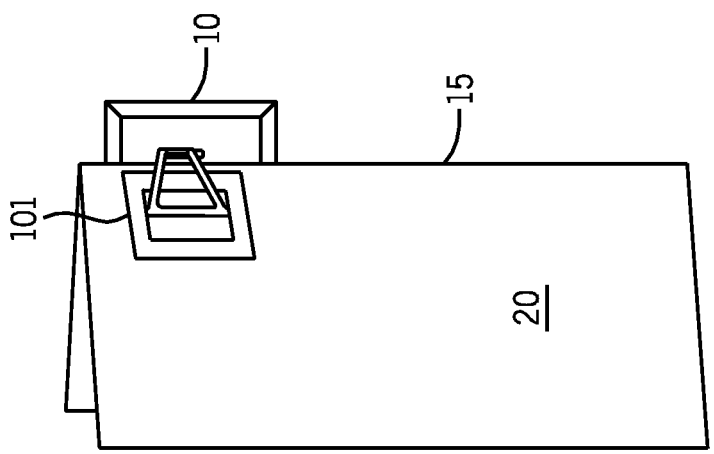
Figure 19A:
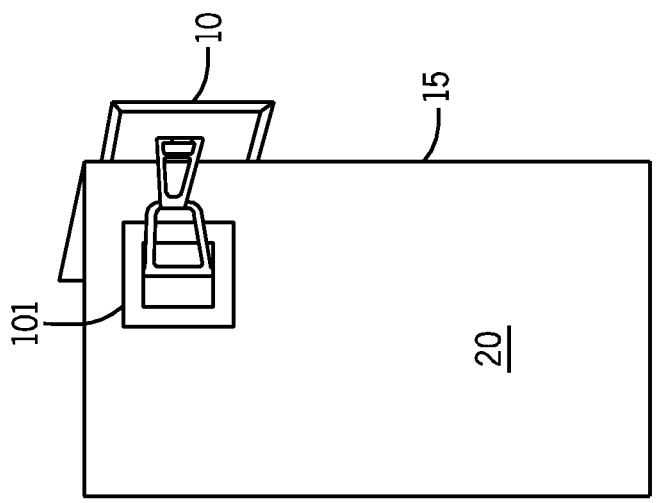

FIGS. 19A-C illustrate an embodiment adapted to articulate around a corner 15. FIG. 19A illustrates an embodiment wherein the surface bracket 110 is affixed a distance from the corner 15, and both the inner articulating arm 131 and the outer articulating arm 132 are substantially parallel to the wall 20 extending the device mounting plate 160 and the attached display 10 past the corner 15 allowing viewing of the display 10 from positions facing a wall 30 at an angle to the wall 20 to which the surface bracket 110 is affixed. FIG. 19B illustrates an embodiment wherein the surface bracket 110 is mounted sufficiently close to the corner 15 such that only the inner articulating arm 131 need be parallel to the wall 20 to provide sufficient length to extend the device mounting plate 160 beyond the corner 15. FIG. 19C illustrates what a user viewing from around the corner 15 from the surface bracket 110 location would see.

FIGS. 20A-C illustrate an embodiment that is both articulating and tilting, providing adjustability to the position of the display 10 in three-dimensions. FIG. 20A illustrates a view looking toward the display 10 mounted to the device mount 101. FIG. 20B illustrates the view from the opposite side. FIG. 20C illustrates the position of the lower tilt mount 170 and upper tilt mount 171 when the device mounting plate 160 is tilted with regard to the outer articulating arm 132.

In one embodiment, the articulating mechanism 130 may be constructed to provide a reinforced design for load-bearing. For example, either the first portion 137a and second portion 137b of the inner articulating arm 131 may be non-parallel to each other such as wherein one of the first portion and second portion function as a strut to reinforce the other. Likewise, the outer articulating member 132 may have a similar structure.

In one embodiment, various connection mechanisms may be used to secure the pivotal connections discussed above. With reference to FIG. 1, one exemplary embodiment utilizes bolts 198 and bushings 199 to secure the surface bracket 110 and inner articulating arm 131, the inner articulating arm 131 and outer articulating arm 132, and the outer articulating arm 132 and the height adjustment mechanism 161.

Figure 21A:
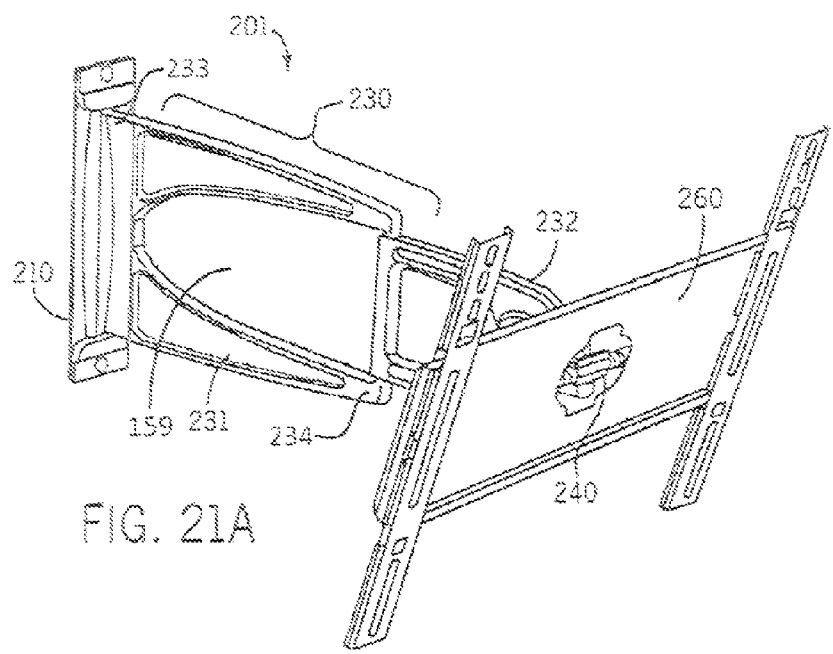
FIG. 21A is a perspective view of another embodiment of a device mount.
Figure 21B:
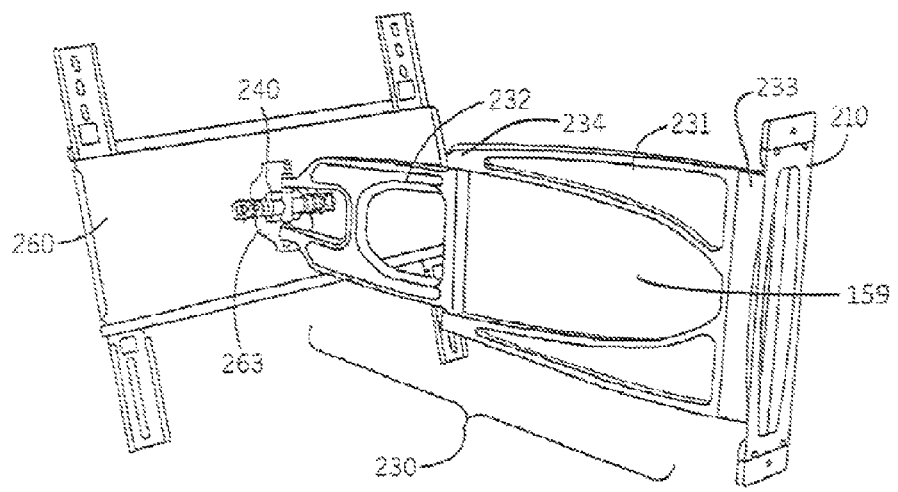
FIG. 21B is a reverse perspective view of the device mount of FIG. 21A.

With reference to FIGS. 21A-B, another embodiment of a hinged device mount 201 is shown. The hinged device mount 201 is also a low profile articulating mounting system that includes a tilt capability. The hinged device mount 201 includes a surface bracket 210, an articulating mechanism 230 and a device mounting plate 260 upon which a display (not shown) may be mounted. The features of the surface bracket 210, the articulating mechanism 230 and the device mounting plate 260 are similar to the features of the device mount 101 already described. In particular, the function of the articulation mechanism 230 is substantially similar to the articulation mechanism 130. Like the device mount 101, the hinged device mount 201 also includes an extended position (FIG. 1, showing device mount 101) and a collapsed position (FIG. 2, showing device mount 101) as well as a plurality of positions there between. One of ordinary skill in the art will appreciate that various devices other than a display device may be utilized with the hinged device mount 201.

As shown in FIGS. 21A-B, the articulating mechanism 230 includes an inner articulating arm 231 pivotally connected to the surface bracket 210 and an outer articulating arm 232 pivotally coupled to the inner articulating arm 231. The inner articulating arm includes a first inner articulating arm end 233 and a second inner articulating arm end 234. The outer articulating arm 232 is pivotally and rotatably attached to the device mounting plate 260 at a tilt assembly 240. The tilt assembly 240 provides simultaneous adjustability to the position of the device mounting plate 260 about a first axis and a second axis. In an embodiment, the device mounting plate 260 is rotatable about a vertical axis 293 and tiltable about a horizontal axis 295, as indicated in FIG. 22B.

Figure 22A:
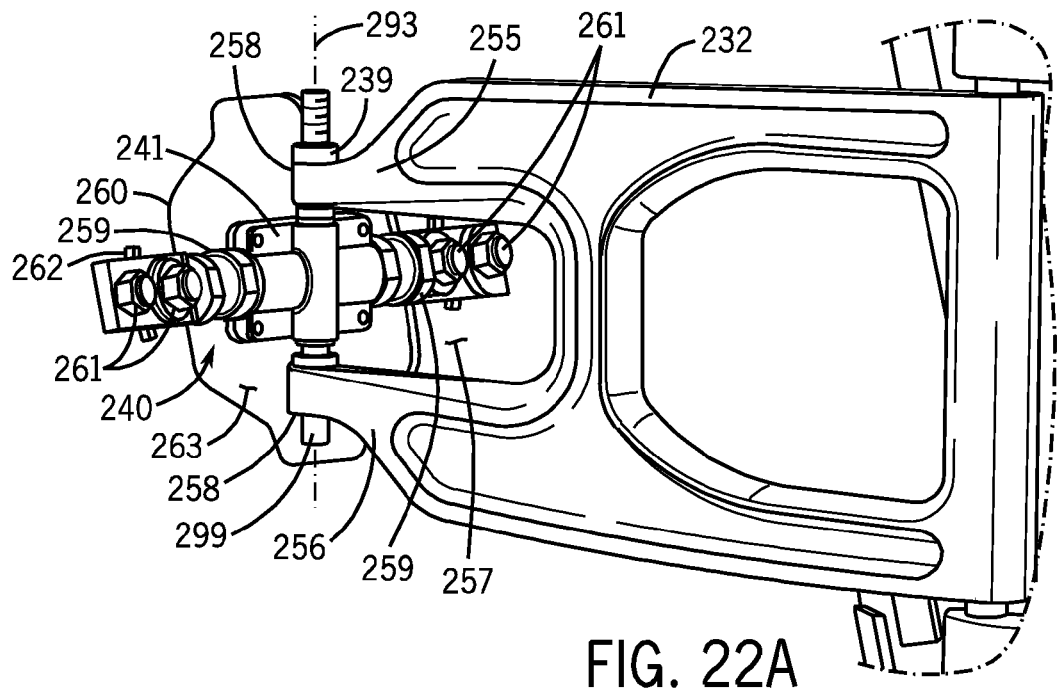
FIG. 22A is a detailed view of the a portion of the device mount as shown in FIG. 21B.

As depicted in FIG. 22A, the outer articulating arm 232 is rotatably attached to the tilt assembly 240 proximate the vertical axis 293. The outer articulating arm 232 may include a relief 257 between an upper portion 255 and a lower portion 256. The upper portion 255 and the lower portion 256 may be configured with a through opening 258. The through opening 258 may define the vertical axis 293. The tilt assembly 240 is rotatably coupled to the outer articulating arm 232 with one or more shafts 299 that are received by the tilt assembly 240 and the through opening 258. Thus, the tilt assembly 240 is rotatable about the vertical axis 293 in relation to the outer articulating arm 232. The relief 257 may be configured such that the tilt assembly 240 is at least partially receivable therein when the tilt assembly 240 is rotated. As such, the attached device mounting plate 260 may be rotatable nearly 360 degrees about the vertical axis 293.

Figure 22B:
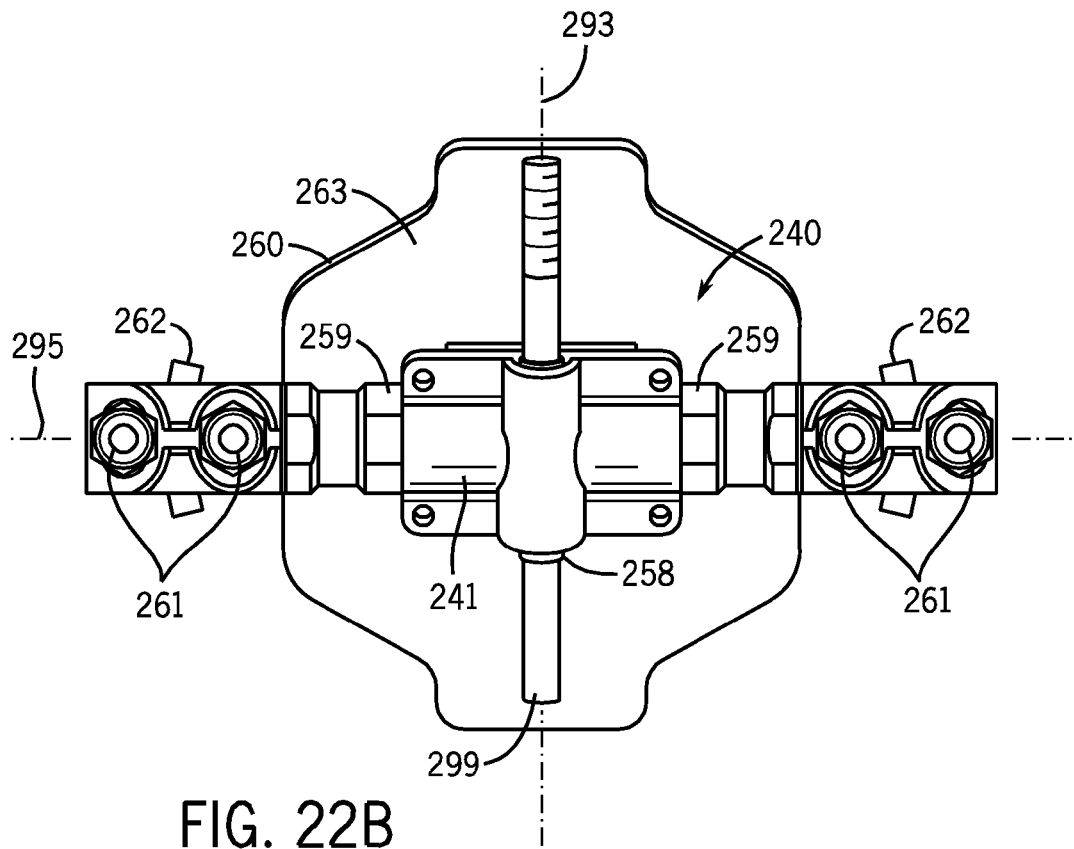
FIG. 22B is a front detailed view showing a portion of the device mount of FIG. 21A.
Figure 25:
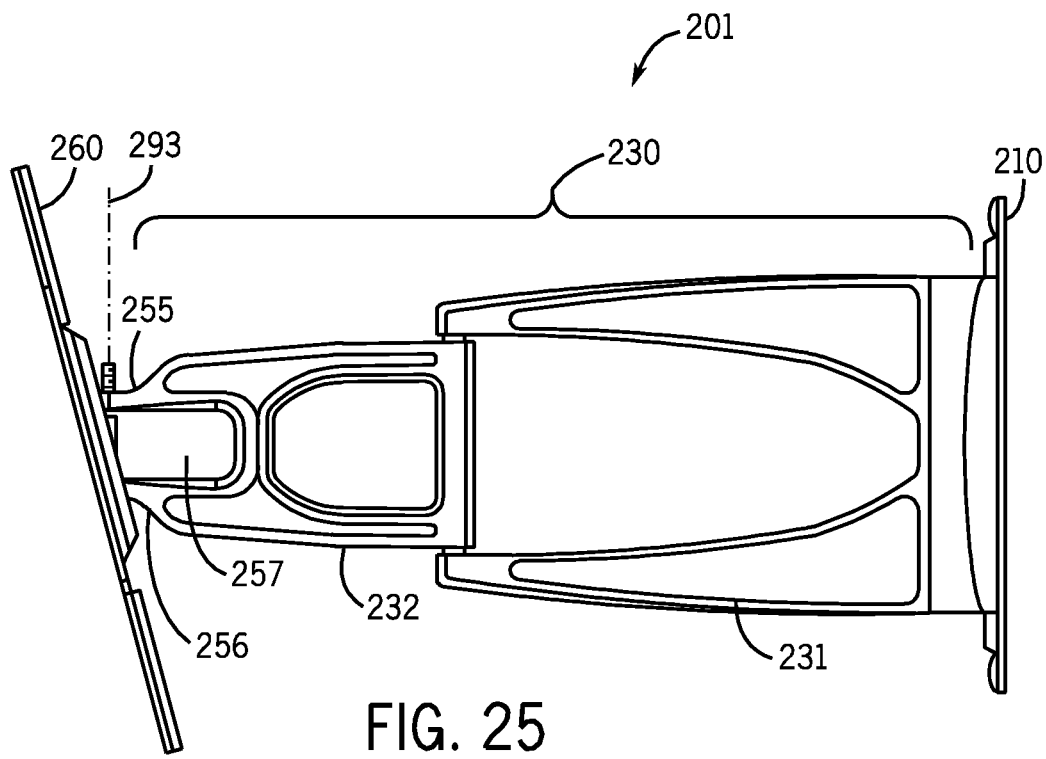
FIG. 25 is a right elevation view of the device mount of FIG. 21A.
Figure 26A:
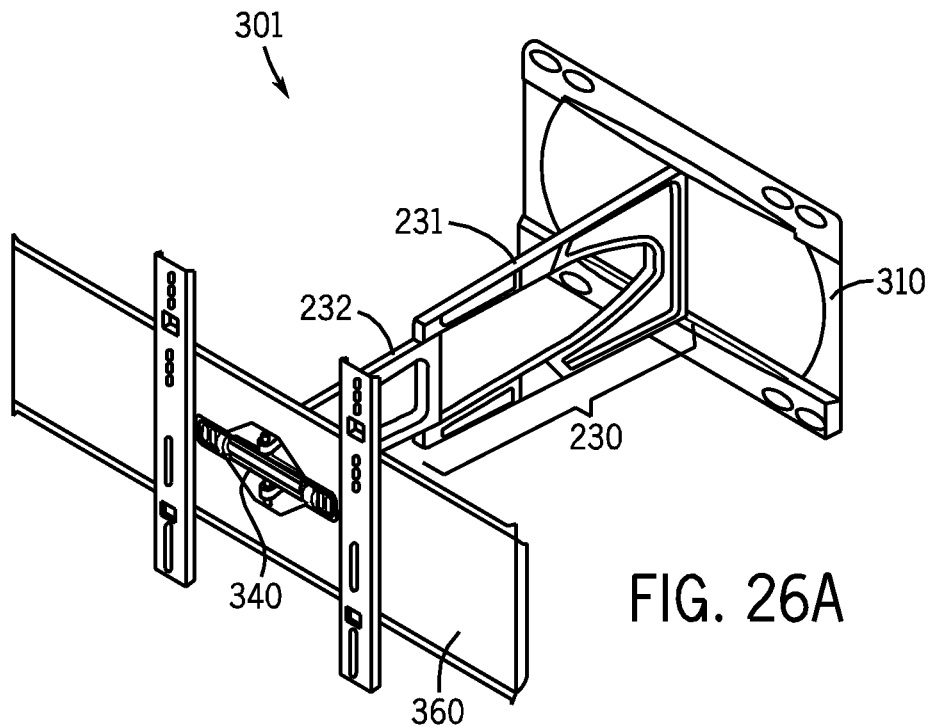
FIG. 26A is a perspective view of yet another embodiment of a device mount.
Figure 26B:
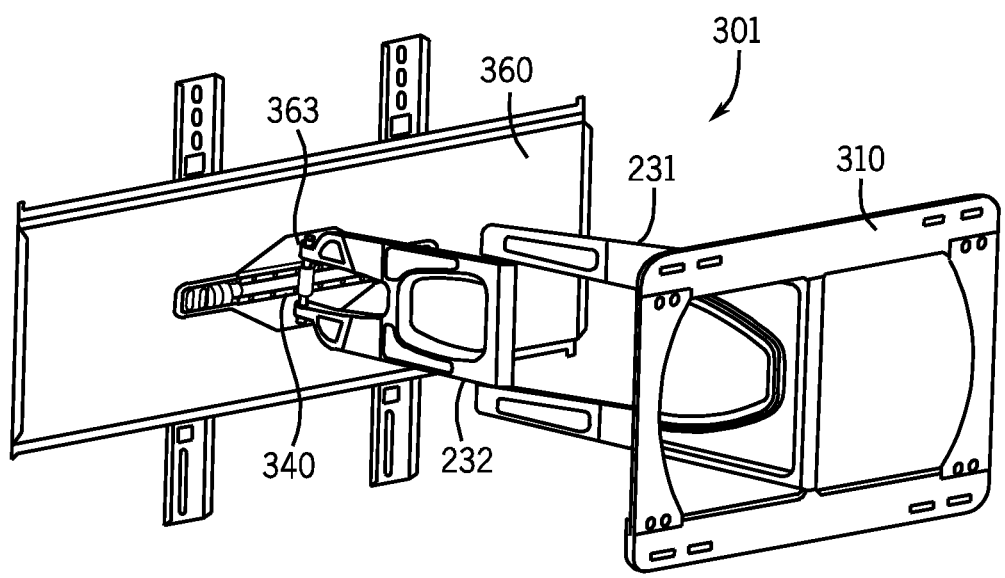
FIG. 26B is a reverse perspective view of the device mount of FIG. 26A.

In addition to rotation about the vertical axis 293, the tilt assembly 240 further permits rotation of the device mounting plate 260 about the horizontal axis 295, as indicated in FIG. 22B, in relation to the outer articulating arm 232. Thus, the attached device (not shown) is selectively tiltable in relation to surface bracket 210 and the mounting surface as depicted in FIG. 25. The tilt orientation of the attached device may be maintained by the tilt assembly 240. As such, despite the weight of the device mounting plate 260 and the attached device that generate a moment about the horizontal axis 295, the tilt assembly 240 maintains the desired tilt orientation of the device mounting plate 260 and attached device.

FIG. 23 shows an exploded view of the tilt assembly 240 of FIGS. 22A and 22B. In the depicted embodiment, the tilt assembly 240 comprises a main body 241, which may be of a generally elongated or rectangular shape. The main body 241 may be constructed of a first half 241a and a second half 241b, forming a pocket opening 242 inside a length of the main body 241. The first half 241a and the second half 241b are attached using a plurality of connecting elements 249. The pocket opening 242 may define the horizontal axis 295. The main body 241 further includes attachment openings 243 that are substantially coaxial with the through opening 258 when the tilt assembly 240 is coupled to the outer articulating arm 232. Accordingly, in an embodiment, the orientation of the attachment openings 243 is substantially orthogonal to the orientation of the pocket opening 242.

Figure 24:
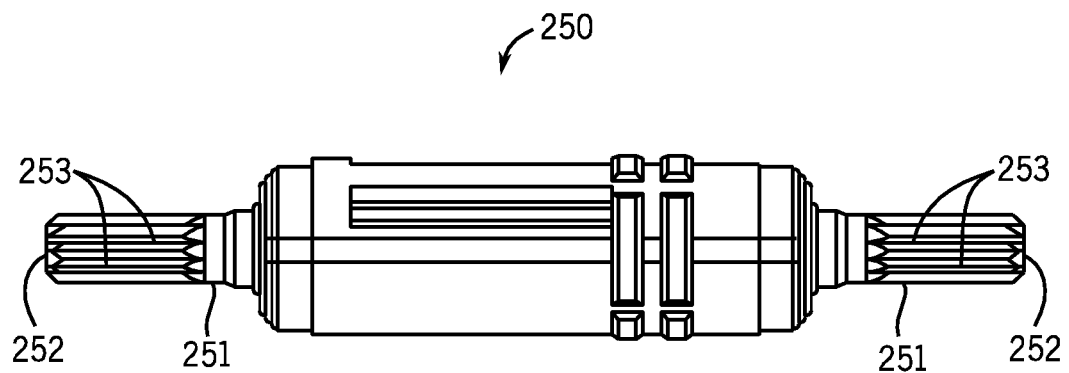
FIG. 24 is a top plan view of a friction hinge assembly of the tilt assembly of FIG. 23.

The attachment openings 243 are configured to receive the one or more shafts 299 to rotatably couple the tilt assembly 240 to the outer articulating arm 232. The attachment openings 243 may comprise a top and a bottom portion or a single through hole. In the former arrangement, an upper shaft 299a is received in the upper portion of the attachment opening 243 and a lower shaft 299b is received in the lower portion of the attachment opening 243. The main body 241 may include securement openings 245 to receive coupling elements 246 to assist in securing the one or more shafts 299 in relation to the main body 241. Additionally, and as shown in FIG. 24, a portion of the one or more shafts 299 received in the attachment openings 243 may be segmented or keyed to further secure the one or more shafts 299 in relation to the main body 241. With reference to FIGS. 22A and 23, at least a portion of the shaft 299 or one of the upper shaft 299a and/or the lower shaft 299b may be threaded and engageable with a securing member 239 that is engageable with a portion of the outer articulating arm. The securing member 239 may be adjusted in relation to the respective shaft 299, upper shaft 299a or the lower shaft 299b to restrain or substantially prevent rotation about the vertical axis 293. Adjustment of the threaded portion may also provide for vertical adjustment of the tilt assembly 240 in relation to the outer articulating arm 232 within the relief 257.

With reference to FIG. 23, a friction hinge assembly 250 is attached to the main body 241 and coupled to the device mounting plate 260. At least a portion of the friction hinge assembly 250 is disposed in the pocket opening 242. One or more engagement features 244 may be disposed within the pocket opening 242 and arranged to mate with complementary features on the friction hinge assembly 250, thereby fixing the friction hinge assembly 250 in relation to the main body 241 and the articulating mechanism 230. In an alternative embodiment, the friction hinge assembly 250 is located in the first half 241a and the respective components overmolded to form a secure assembly. The friction hinge assembly 250 includes a hinge shaft 251 that extends from one or more ends of the friction hinge assembly 250 and rotatable in relation thereto. In an embodiment, the hinge shaft 251 may be substantially coaxial with the horizontal axis 295.

As best seen in FIG. 24, each end 252 of the hinge shaft 251 can include one or more keying features 253 such as a plurality of spines as shown. The hinge shaft 251 extends from the main body 241, exposing one or more of the ends 252. As seen in FIG. 23, each of the ends 252 is fixed to a connector 259. The connector 259 may include connector openings 248 and a mounting plate engagement feature 257 to facilitate securement of the connector 259 to the device mounting plate 260. The connector 259 further includes a pocket 254 to engage the end 252. The pocket 254 may include features to engage the keying features 253 of the hinge shaft 251 such as ridges and/or groves that may interface with the splines. In an embodiment, the connector 259 is pressed onto the end 252. However, other forms of connection known in the art may be used to couple the connector 259 with the end 252. In a particular embodiment, the connector 259 is cast, but it may formed by other processes.

As shown in FIGS. 22A and 22B, each of the connectors 259 is attached to the device mounting plate 260. A plurality of connecting elements 261 received by the connector openings 248 and the device mounting plate openings 262 may be used to secure each the connectors 259 to the device mounting plate 260. As best seen in FIG. 22B, the device mounting plate 260 may also include device mounting plate openings 262 that are configured to receive the mounting plate engagement features 257 (depicted in FIG. 23), further securing each of the connectors 259 to the device mounting plate 260. Accordingly, the above arrangement rotatably couples the device mounting plate 260 to the tilt assembly 240 about the horizontal axis 295 via the hinge shaft 251 that is rotatable within the hinge assembly 250 within the tilt assembly 240. The device mounting plate 260 may include a central opening 263 to accommodate at least a portion of the tilt assembly 240 when the device mounting plate 260 is in a tilted orientation as shown in FIG. 25.

Thus, the device mounting plate 260 is selectively tiltable about the horizontal axis 295 in relation to the mounting surface. The friction hinge assembly 250 maintains the tilt orientation of the device mounting plate 260, counteracting the moment generated by the device mounting plate 260 and an attached device. For example, when the device mounting plate 260 is orientated as shown in FIG. 25 with a "downward" tilt, the friction hinge assembly 250 counteracts the positive moment to prevent the device mounting plate 260 and any attached device (not shown), to maintain the selected tilt orientation and prevent further tilt from occurring. Accordingly, the friction hinge assembly 250 provides a resistively rotatable hinge shaft 251.

FIGS. 26A-29 depict a further embodiment of a tilt assembly 340. The tilt assembly 340 is rotatably coupled to outer articulating arm 232 proximate the vertical axis 293 as described above with regard to the tilt assembly 240. The tilt assembly 340 is likewise rotatably coupled to the device mounting plate 360 about the horizontal axis 295. Thus, the attached device (not shown) is selectively rotatable and tiltable in relation to a surface plate 310. The tilt assembly 340 is configured to provide additional rotational counter resistance to the device mounting plate 360 and attached device. As such, the tilt assembly 340 may be advantageously suited to applications where the attached device is large and/or heavy or where a particularly robust mounting arrangement is desired.

FIG. 27 shows an exploded view of an embodiment of the tilt assembly 340. In the depicted embodiment, the tilt assembly 340 comprises a main body 341, which may be of a generally elongated or rectangular shape. The main body 341 may be constructed of a first half 341a and a second half 341b, forming a pocket opening 342 inside a length of the main body 341. The first half and the second half 341a and 341b are attached using a plurality of connecting elements 349. The pocket opening 342 may define the horizontal axis 295. The main body 341 further includes attachment openings 343 that are substantially coaxial with the through opening 258 when the tilt assembly 340 is coupled to the outer articulating arm 232. Accordingly, in an embodiment, the attachment openings 343 are substantially orthogonal to the pocket opening 342.

Figure 28A:
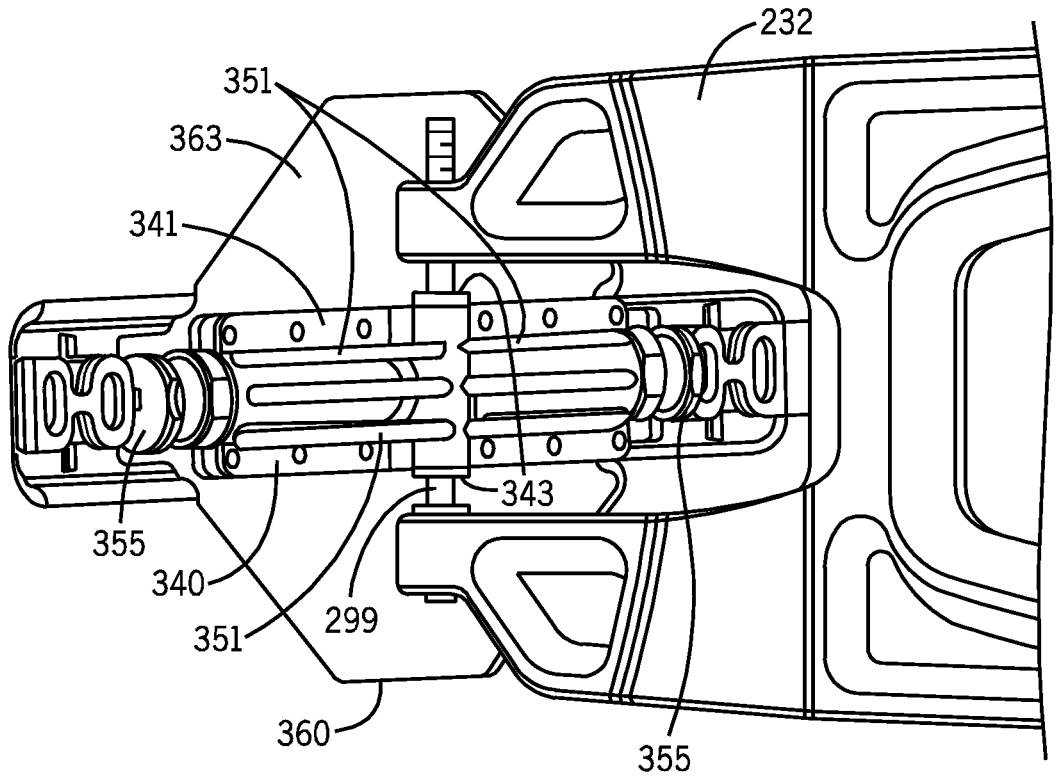
FIG. 28A is a detailed view of the a portion of the device mount as shown in FIG. 61B.

As already described with regard to the embodiment depicted in FIGS. 21A-25, the attachment openings 343 are configured to receive the one or more shafts 299, such as 299a and 299b, to rotatably couple the tilt assembly 340 to the outer articulating arm 232. As shown in FIG. 28A, the main body 341 may include one or more reinforcements 351. The reinforcements 351 provide additional stiffness to the main body 341 and, in particular, reinforcement in relation to the openings 343 receiving the one or more shafts 299.

As shown in FIG. 27, a first friction hinge assembly 250a and a second friction hinge assembly 250b are attached to the main body 341. As shown in FIG. 28A, the first friction hinge assembly 250a and the second friction hinge assembly 250b are each rotatably coupled to the device mounting plate 360 via one or more of a hinge shaft 251. At least a portion of each of the friction hinge assemblies 250a and 250b is disposed in the pocket opening 342. One or more engagement features 344 may be disposed within the pocket opening 342 and arranged to mate with complementary features on each of the friction hinge assemblies 250a and 250b, thereby fixing them in relation to the main body 341 and, ultimately, the articulating mechanism 230. In an alternative embodiment, each of the friction hinge assemblies 250a and 250b is coupled to the first half 341a and the components are overmolded to form a secure assembly. Each of the friction hinge assemblies 250a and 250b include the hinge shaft 251 that is resistively rotatable in relation to the respective friction hinge assembly 250a and 250b and extends from one or more ends of the respective friction hinge assembly 250a and 250b. In an embodiment, each of the hinge shafts 251 may be substantially coaxial with the horizontal axis 295.

As best seen in FIG. 27, an end 352 of the hinge shaft can include one or more keying features 253 such as a plurality of splines as shown. The hinge shaft 251 extends from each end of the main body 341, exposing at least two of the ends 352. As seen in FIG. 28A, each of the ends 352 that are exposed is coupled to a connector 355. The connector 355 may include a connector opening 356 and a mounting plate engagement feature 357 to facilitate securement of the connector 355 to the device mounting plate 360. The connector 355 further includes a pocket 358 to fix the connector 355 to the end 352. The pocket 358 may include various features to engage the keying features 253 such as ridges and/or groves that may interface with the splines. In an embodiment, the connector 355 is pressed onto the end 352. However, other forms of connection known in the art may be used to secure the connector 355 to the end 352.

Figure 28B:
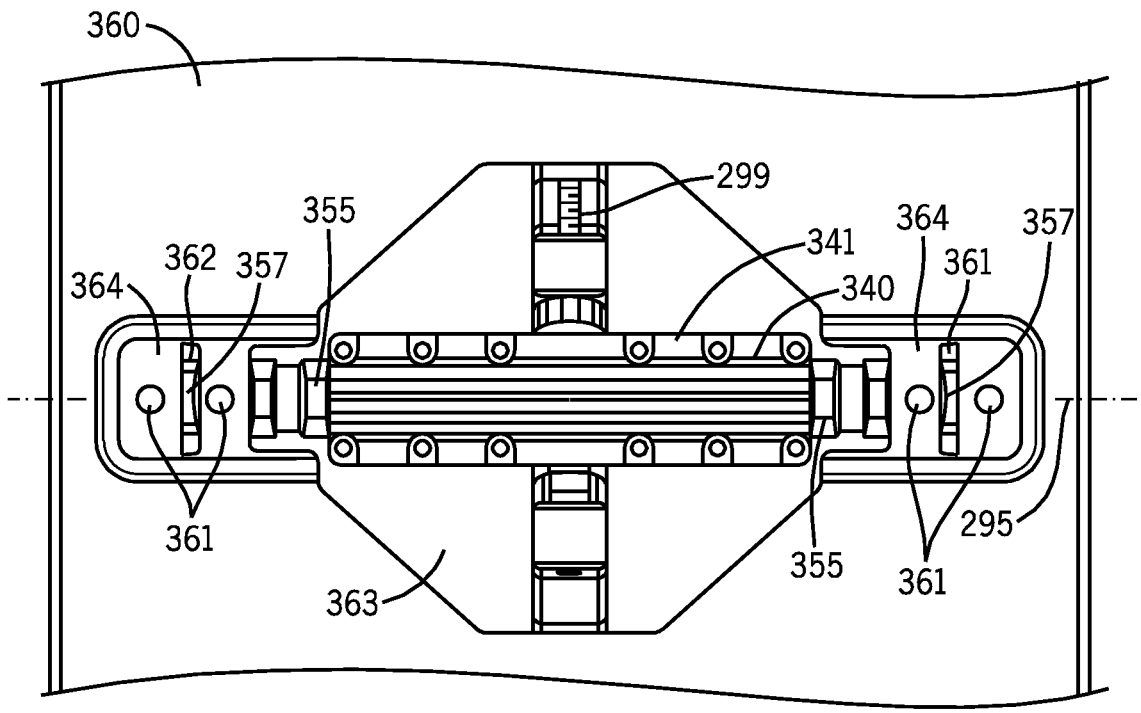
FIG. 28B is a front detailed view showing a portion of the device mount of FIG. 26A.

With reference to FIGS. 27, 28A and 28B, each of the connectors 355 is attached to the device mounting plate 360. A plurality of connecting elements 361 received by the connector openings 356 and device mounting plate openings 362 may be used to secure each of the connectors 355 to the device mounting plate 360. As best seen in FIG. 28B, the device mounting plate 360 may also include device mounting plate openings 362 that are configured to receive the mounting plate engagement features 357, further securing each of the connectors 355 to the device mounting plate 360. The mounting plate 360 may further include a recessed portion 364 where each of the connectors 355 may be coupled to the device mounting plate 360. The recessed portion 364 allows the tilt assembly 340 to at least partially nest within the device mounting plate 360, thereby maintaining a relatively thin profile of the hinged mounting device 301 when it is in the fully retracted orientation where the device mounting plate 360 is proximate the mounting surface. The recessed portion 364 further allows the tilt assembly 340 and the horizontal axis 295 to be positioned in proximity of the center of gravity of the device mounting plate 360 and attached device, thereby permitting attachment of a more massive device and/or reducing the counteracting force supplied to resist rotation of the shaft 251.

Accordingly, the above arrangement rotatably couples the device mounting plate 360 to the tilt assembly 340 about the horizontal axis 295. The device mounting plate 360 may include a central opening 363 to accommodate at least a portion of the tilt assembly 340 when the device mounting plate 360 is in a tilted orientation.

With regard to the hinged device mounts 201 and 301, the respective device mounting plate 260 and 360 is selectively liftable about the horizontal axis 295 in relation to the mounting surface. In one embodiment, each of the device mounting plates 260 and 360 is infinitely adjustable between a tilt angle of 0 to about ±15 degrees with respect to the outer articulating arm 132. Each of the friction hinge assemblies 250 or 250a and 250b maintain the tilt orientation of the device mounting plates 260 or 360, respectively, resisting the moment generated by the device mounting plate 260 and 360 and the device attached thereto (not shown). For example, when the device mounting plate 260 is orientated as shown in FIG. 25 with a "downward" tilt, the friction hinge assembly 250 resists the positive moment to prevent the device mounting plate 260 and any attached device to maintain the user selected tilt orientation and prevent further tilt.

Although each of the friction hinge assemblies 250 or 250a and 250b prevent unintentional changes of tilt orientation, each it is generally configured so as not to impede a user from selecting and or changing the tilt orientation or require the user to exert undue force when tilting the attached device. In fact, each of the friction hinge assemblies 250 or 250a and 250b may be configured to assist a user in changing the tilt orientation of the device mounting plate 260 or 360 in one direction. For example, the friction hinge assembly 250 or 250a and 250b may be configured such that rotating the device mounting plate 260 counterclockwise according to FIG. 25 (i.e., tilting a top portion away from the surface bracket 210) requires less user supplied force than a clockwise rotation. To that end, an optional biasing element (not shown) may be coupled to the hinge shaft 251 and the connector 259 or 355 to provide additional rotational force in a particular direction of rotation. In an embodiment, the biasing element comprises a torsion spring placed over the end 252 or 352 prior to pressing the connector 259 or 355 onto the hinge shaft 251 and is further received in an opening in the main body 241 or 341 and an opening in the connector 259 or 355.

In an embodiment, each of the friction hinge assemblies 250, 250a and 250b comprise a self contained high torque friction hinge assembly. In a particular embodiment, each of the friction hinge assemblies 250, 250a and 250b comprises a self contained high torque friction hinge assembly of the type available from, for example, Reell Precision Manufacturing Corporation.

In a variation of the hinged device mounts 201 and 301, the respective tilt assembly 240 and 340 may be fixedly attached to the outer articulating arm 232. That is, each of the tilt assemblies 240 and 340 is not rotatably pivotable about vertical axis 293 in relation to the outer articulating arm 232. In another variation, the outer articulating arm 232 is eliminated and the respective tilt assembly 240 and 340 is rotatably coupled to the inner articulating arm 231. These, and other variations, are within the scope of the present invention.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated. The features of the embodiments described herein may be combined in all possible combinations, of methods, apparatus, modules and systems.

What is claimed is:

1. A hinged articulating mount comprising:

surface mount;

an articulation mechanism having an inner articulating arm and an outer articulating arm, the inner articulating arm having a void therein within which the outer articulating arm may collapsibly nest, the inner articulating arm pivotally affixed at a first inner articulating arm end to the surface mount, the inner articulating arm rotatably affixed at a second inner articulating arm end to a first end of the outer articulating arm, the inner articulating arm adapted to pivot in relation to the surface mount about a first vertical axis to a position substantially parallel to the surface mount, the outer articulating arm adapted to rotate in relation to the inner articulating arm about a second vertical axis to a position within the void of the inner articulating arm substantially parallel to the surface mount, the outer articulating arm having a second end having an upper portion and a lower portion;

a tilt assembly having an intermediate portion, a first end extending from the intermediate portion, and a second end extending from the intermediate portion and opposite the first end, the tilt assembly pivotally affixed to the second end of the outer articulating arm via a shaft extending from upper portion to the lower portion through the intermediate portion of the tilt assembly and positioned at least partially within a relief of the outer articulating arm defined by the upper portion and the lower portion, the tilt assembly adapted to pivot in relation to the outer articulating arm about a third vertical axis, the tilt assembly further rotatable about a horizontal axis; and a device mount plate adapted to have a device mounted thereto, the device mount plate affixed to the tilt assembly at the first end and the second end of the tilt assembly, the device mount plate being selectively tillable about the horizontal axis via the tilt assembly;

the tilt assembly further adapted to pivot about the third vertical axis in relation to the outer articulating arm to a first position such that at least a portion of the first end of the tilt assembly is received within the relief of the outer articulating arm when the device mount plate is in a third position that is substantially parallel to the outer articulating arm and the outer articulating arm is collapsibly nested in the inner articulating arm, the second end extending away from the relief, and to a second position such that at least a portion of the second end of the tilt assembly is received within the relief of the outer articulating arm when the device mount plate is in a fourth position that is substantially parallel to the outer articulating arm and the outer articulating arm is collapsibly nested in the inner articulating arm, the first end extending away from the relief.

2. The articulating mount of claim 1, wherein the tilt assembly comprises a first friction hinge assembly coupled to the device mount plate at a first location, and wherein the first friction hinge assembly is configured to substantially maintain a tilt orientation of the device mount at a selected tilt angle.

3. The articulating mount of claim 2, wherein the selected tilt angle is non-zero.

4. The articulating mount of claim 2, wherein the tilt assembly further comprises a second friction hinge assembly coupled to the device mount plate at a second location.

5. The articulating mount claim 1 wherein the outer articulating arm is rotatable such that the outer articulating arm is substantially disposed within the inner articulating arm and substantially co-planar therewith.

6. A hinged articulating mount comprising:
a surface mount;
an articulation mechanism having an inner articulating arm and an outer articulating arm, the inner articulating arm having a void therein within which the outer articulating may collapsibly nest, the inner articulating arm pivotally affixed at a first inner articulating arm end to the surface mount, the inner articulating arm rotatably affixed at a second inner articulating arm end to a first end of the outer articulating arm, the inner articulating arm adapted to pivot in relation to the surface mount about a first vertical axis to a position substantially parallel to the surface mount, the outer articulating arm adapted to rotate in relation to the inner articulating arm about a second vertical axis to a position within the void of the inner articulating arm substantially parallel to the surface mount;
a tilt assembly having an intermediate portion, a first end extending from the intermediate portion, and a second end extending from the intermediate portion and opposite the first end, the intermediate portion of the tilt assembly at least partially received within a relief of an arm of the articulating arm assembly, the tilt assembly pivotally coupled to the articulating arm assembly and rotatable about a third axis; and
a device mount assembly having a device mount plate, the device mount assembly coupled to the tilt assembly at the first end and the second end of the tilt assembly, the device mount plate configured for operative attachment to a device, the device mount assembly selectively rotatable via the tilt assembly about a fourth axis,
wherein the tilt assembly is configured to substantially maintain the rotational orientation of the device mount assembly about the fourth axis,
wherein the tilt assembly is adapted to pivot about the third axis in relation to the arm to a first position such that at least a portion of the first end of the tilt assembly is received within the relief of the arm when the device mount plate is in a third position that is substantially parallel to the arm and substantially parallel to the surface mount, the second end extending away from the relief, and to a second position such that at least a portion of the second end of the tilt assembly is received within the relief of the arm when the device mount plate is in a fourth position substantially parallel to the arm and substantially parallel to the surface mount, the first end extending away from the relief.

7. The hinged articulating mount of claim 6, wherein the tilt assembly comprises a first fiction hinge assembly having a first resistively rotatable shaft coupled to the device mount assembly.

8. The articulating mount of claim 7, wherein the tilt assembly further comprises a second friction hinge assembly having a second resistively rotatable shaft coupled to the device mount assembly.

9. The hinged articulating mount of claim 6, wherein the outer articulating arm is adapted to rotate in relation to the inner articulating arm to a position within the void of the inner articulating arm substantially coplanar with the inner articulating arm.

\* \* \* \* \*

UNITED STATES PATENT AND TRADEMARK OFFICE
CERTIFICATE OF CORRECTION

| | | |
|---|---|---|
| PATENT NO. | : 8,561,955 B2 | Page 1 of 1 |
| APPLICATION NO. | : 12/637018 | |
| DATED | : October 22, 2013 | |
| INVENTOR(S) | : Stemple | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 671 days.

Signed and Sealed this
Fourteenth Day of April, 2015

Michelle K. Lee
*Director of the United States Patent and Trademark Office*